United States Patent
You et al.

(10) Patent No.: US 12,382,528 B2
(45) Date of Patent: Aug. 5, 2025

(54) RADIO RESOURCE CONTROL RRC REESTABLISHMENT METHOD AND APPARATUS

(71) Applicant: HUAWEI TECHNOLOGIES CO., LTD., Guangdong (CN)

(72) Inventors: Chunhua You, Shanghai (CN); Qinghai Zeng, Shanghai (CN); Haiyan Luo, Shenzhen (CN); Chong Lou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 427 days.

(21) Appl. No.: 17/966,524

(22) Filed: Oct. 14, 2022

(65) Prior Publication Data

US 2023/0035046 A1  Feb. 2, 2023

Related U.S. Application Data

(63) Continuation of application No. PCT/CN2020/085327, filed on Apr. 17, 2020.

(51) Int. Cl.
*H04W 76/19* (2018.01)
*H04W 36/00* (2009.01)

(52) U.S. Cl.
CPC .......... *H04W 76/19* (2018.02); *H04W 36/13* (2023.05)

(58) Field of Classification Search
CPC .. H04W 76/19; H04W 36/13; H04W 36/0079
See application file for complete search history.

(56) References Cited

U.S. PATENT DOCUMENTS

2023/0056855 A1* 2/2023 Jiang ................ H04W 36/0072

FOREIGN PATENT DOCUMENTS

| CN | 108566309 A |   | 9/2018 |           |
|----|-------------|---|--------|-----------|
| CN | 109121160 A |   | 1/2019 |           |
| CN | 109168180 A | * | 1/2019 | H04W 36/0011 |

(Continued)

OTHER PUBLICATIONS

HTC, "Discussion on CN Type Selection in RRC Connection Re-Establishment," 3GPP TSG-RAN WG2 NR RAN2#100, R2-1713745, Reno, US, Nov. 17-Dec. 1, 2017, 4 pages.

(Continued)

*Primary Examiner* — Said M Elnoubi
(74) *Attorney, Agent, or Firm* — Fish & Richardson P.C.

(57) ABSTRACT

The present disclosure relates to radio resource control (RRC) reestablishment methods and apparatuses. In one example method, a terminal device selects a target cell, where the target cell supports an expected network slice. The terminal device sends an RRC reestablishment request message by using the target cell. The expected network slice may include a network slice that the terminal device expects to access, or a network slice corresponding to a PDU session established by the terminal device by using a last serving access network device of the terminal device. The terminal device may select the target cell within a preset time period. For example, the terminal device starts a first timer when the terminal device starts selecting the target cell, and selects the target cell during running of the first timer. The first timer may be specific to one or more network slices or all network slices.

20 Claims, 14 Drawing Sheets

(56) References Cited

FOREIGN PATENT DOCUMENTS

| | | | |
|---|---|---|---|
| CN | 110035461 A | | 7/2019 |
| CN | 110999390 A | | 4/2020 |
| EP | 3509355 A1 | | 7/2019 |
| KR | 20180039567 A | * | 4/2018 |
| WO | WO-2018141287 A1 | * | 8/2018 ........ H04W 36/0088 |

OTHER PUBLICATIONS

International Search Report and Written Opinion in International Appln. No. PCT/CN2020/085327, mailed on Jan. 15, 2021, 13 pages (with English translation).

* cited by examiner

|  | Cell 1 | Cell 2 | Cell 3 | Cell 4 |
|---|---|---|---|---|
| Network slice | Network slice 1 | Network slice 2 | No network slice | Network slice 2 |

RADIO RESOURCE CONTROL RRC REESTABLISHMENT METHOD AND APPARATUS

CROSS-REFERENCE TO RELATED APPLICATIONS

This application is a continuation of International Application No. PCT/CN2020/085327, filed on Apr. 17, 2020, the disclosure of which is hereby incorporated by reference in its entirety.

TECHNICAL FIELD

This application relates to the communications field, and more specifically, to a radio resource control (radio resource control, RRC) reestablishment method and an apparatus.

BACKGROUND

In a mobile communication system, after a terminal device and a network device enter an RRC connected mode, if a case such as a radio link failure (radio link failure, RLF), a synchronous reconfiguration failure (reconfiguration with sync failure), an integrity check failure (integrity check failure), an RRC connection reconfiguration failure (RRC connection reconfiguration failure), or an inter-RAT handover failure (mobility from NR failure) occurs, ail RRC reestablishment procedure is triggered. In the RRC reestablishment procedure, the terminal device performs cell selection, and selects a new suitable cell to camp on as soon as possible.

In a conventional cell selection process, once selecting a cell that meets a cell selection condition, the terminal device initiates a random access process by using the cell, to reestablish an RRC connection. In other words, the terminal device selects the cell that meets the cell selection condition.

In a 5th generation (5th generation, 5G) communication system, a network slice is introduced. In this case, how to ensure RRC reestablishment is a problem worth considering.

SUMMARY

In view of this, this application provides an RRC reestablishment method and an apparatus, to be applicable to a communication system including a network slice.

According to a first aspect, this application provides an RRC reestablishment method. The method includes: A terminal device selects a target cell, where the target cell supports an expected network slice; and the terminal device sends an RRC reestablishment request message by using the target cell.

It should be understood that the RRC reestablishment procedure (RRC connection re-establishment procedure) may alternatively be replaced with an RRC connection reestablishment procedure, an RRC connection reestablishment step, or the like. This is not distinguished in embodiments of this application.

Optionally, that the terminal device selects the target cell includes: after detecting a radio link failure, a synchronous reconfiguration failure, an integrity check failure, an RRC connection reconfiguration failure, an inter-RAT handover failure, or the like, the terminal device starts selecting the target cell.

That the terminal device selects a target cell may be understood as follows: The terminal device starts selecting a target cell; and the terminal device selects the target cell.

It should be noted that a process in which the terminal device selects the target cell may be a step in the RRC reestablishment procedure, or may not belong to the RCC reestablishment procedure. For example, the process in which the terminal device selects the target cell is before the RRC reestablishment process. In other words, the terminal device starts the RRC reestablishment procedure only after the terminal device selects the target cell.

In the foregoing technical solution, when selecting a cell, the terminal device considers whether the cell supports an expected network slice, so that the method is applicable to the communication system including the network slice. In addition, the terminal device selects a cell that supports a specific network slice to initiate random access, so that cell handover caused because an access cell does not support the network slice expected to be used by the terminal device can be avoided. This helps reduce a delay of accessing, by the terminal device, the cell that supports the specific network slice.

With reference to the first aspect, in a possible implementation, the expected network slice is a network slice that the terminal device expects to access.

The foregoing technical solution helps avoid cell handover caused because an access cell does not support the network slice that the terminal device expects to access, to reduce a delay of accessing, by the terminal device, the cell that the terminal device expects to access.

With reference to any one of the first aspect and the foregoing possible implementations, in another possible implementation, the expected network slice is a network slice corresponding to a protocol data unit (protocol data unit, PDU) session established by the terminal device by using a first access network device, and the first access network device is a last serving access network device of the terminal device.

In this embodiment, the terminal device selects the cell that supports the network slice corresponding to the PDU session that is established by using the first access network device. This can avoid a case in which the cell selected in the RRC reestablishment procedure does not support a service of the network slice, to help improve service continuity of the terminal device.

With reference to any one of the first aspect and the foregoing possible implementations, in another possible implementation, the method further includes: The terminal device receives a first message from a second access network device, where the first message includes information indicating that the target cell supports the expected network slice, and the second access network device is an access network device to which the target cell belongs.

The second access network device is an access network device to which the target cell belongs. In other words, a cell of the second access network device includes the target cell.

In the foregoing technical solution, the terminal device may determine, based on information from the second access network device, whether the cell supports the expected network, so that the terminal device can preferentially select a cell that supports a specific network slice to initiate random access, to avoid cell handover caused because an access cell does not support the network slice expected to be used by the terminal device. This helps reduce a delay of accessing, by the terminal device, the cell that supports the specific network slice.

Optionally, the first message may be a broadcast message, or may be dedicated signaling.

Optionally, the first message may be an RRC message, media access control (medium access control, MAC) signaling, or the like.

Optionally, the first message may further include information about whether a neighboring cell of the cell supports the expected network slice.

Optionally, the first message includes an identifier of one or more network slices supported by the cell.

With reference to any one of the first aspect and the foregoing possible implementations, in another possible implementation, the method further includes: The terminal device receives a second message from a first access network device, where the second message includes information about a first frequency, the first frequency supports the expected network slice, and the first access network device is a last serving access network device of the terminal device.

By using the foregoing technical solution, the terminal device can search for a cell in a specific frequency range, to accelerate selection of the target cell that supports the expected network slice. This helps reduce a delay of accessing, by the terminal device, the cell that supports the specific network slice.

Optionally, the second message includes a frequency list, and a frequency in the list supports the expected network slice.

Optionally, the second message may be a broadcast message, or may be dedicated signaling.

Optionally, the second message may be an RRC message, MAC signaling, or the like.

Optionally, that the first frequency supports the expected network slice may be understood as that all cells at the first frequency support the expected network slice. The terminal device determines that a candidate cell found on the first frequency supports the expected network slice.

Optionally, that the first frequency supports the expected network slice may be further understood as that a cell at the first frequency includes a cell that supports the expected network slice. In this case, because the candidate cell found on the first frequency may or may not support the expected network slice, after finding the candidate cell on the first frequency, the terminal device may further determine, based on the first message, whether the candidate cell supports the expected network slice.

For example, after the terminal device finds the candidate cell on the first frequency, the terminal device further reads system information of the candidate cell. The system information of the candidate cell includes information indicating whether the candidate cell supports the expected network slice. In this way, the terminal device can determine whether the candidate cell supports the expected network slice.

With reference to any one of the first aspect and the foregoing possible implementations, in another possible implementation, the method further includes: The terminal device receives a second message from a first access network device, where the second message includes information about a third frequency, the third frequency does not support the expected network slice, and the first access network device is a last serving access network device of the terminal device.

In the foregoing technical solution, the terminal device can perform cell search in a small frequency range, to accelerate selection of the target cell that supports the expected network slice. This helps reduce a delay of accessing, by the terminal device, the cell that supports the specific network slice.

Optionally, the second message may be a broadcast message, or may be dedicated signaling.

Optionally, the second message may be an RRC message, MAC signaling, or the like.

Optionally, the second message includes a frequency list, and a frequency in the list does not support the expected network slice.

With reference to any one of the first aspect and the foregoing possible implementations, in another possible implementation, the method further includes: The terminal device receives a third message from a first access network device, where the third message includes at least one cell identifier, a cell corresponding to the at least one cell identifier supports the expected network slice, the at least one cell identifier includes an identifier of the target cell, and the first access network device is a last serving access network device of the terminal device.

In the foregoing, technical solution, the terminal device may determine, based on cell set information from the second access network device, whether the cell supports the expected network, so that when selecting a cell, the terminal device can determine whether the cell supports the expected network slice, and preferentially select a cell that supports a specific network slice to initiate random access, to avoid cell handover caused because an access cell does not support the network slice expected to be used by the terminal device. This helps reduce a delay of accessing, by the terminal device, the cell that supports the specific network slice.

Optionally, the third message includes a cell identifier list, and a cell corresponding to a cell identifier in the list supports the expected network slice.

Optionally, the third message may be a broadcast message, or may be dedicated signaling.

Optionally, the third message may be an RRC message, MAC signaling, or the like.

In an example, when an identifier of a cell belongs to the at least one cell identifier, the terminal device determines that the cell supports the expected network slice. When an identifier of a cell does not belong to the at least one cell identifier, the terminal device determines that the cell does not support the expected network slice.

With reference to any one of the first aspect and the foregoing possible implementations, in another possible implementation, the method further includes: The terminal device receives a third message from a first access network device, where the third message includes at least one cell identifier, a cell corresponding to the at least one cell identifier does not support the expected network slice, and the first access network device is a last serving access network device of the terminal device.

In the foregoing technical solution, the terminal device may determine, based on cell set information from the second access network device, whether the cell supports the expected network, so that when selecting a cell, the terminal device can determine whether the cell supports the expected network slice, and preferentially select a cell that supports a specific network slice to initiate random access, to avoid cell handover caused because an access cell does not support the network slice expected to be used by the terminal device. This helps reduce a delay of accessing, by the terminal device, the cell that supports the specific network slice.

Optionally, the third message includes a cell identifier list, and a cell corresponding to a cell identifier in the list does not support the expected network slice.

Optionally, the third message may be a broadcast message, or may be dedicated signaling.

Optionally, the third message may be an RRC message, MAC signaling, or the like.

In an example, when an identifier of a cell does not belong to the at least one cell identifier, the terminal device determines that the cell supports the expected network slice. When an identifier of a cell belongs to the at least one cell identifier, the terminal device determines that the cell does not support the expected network slice.

With reference to any one of the first aspect and the foregoing possible implementations, in another possible implementation, that the terminal device selects the target cell includes: The terminal device selects the target cell within a preset time period.

In other words, the terminal device considers, only within a preset time period, whether the cell supports the expected network slice, and beyond the preset time period, the terminal device does not consider whether the cell supports the expected network slice. This can prevent the terminal device from entering an idle mode because the terminal device cannot select a target cell for a long time.

With reference to any one of the first aspect and the foregoing possible implementations, in another possible implementation, the method further includes: The terminal device starts a first timer when the terminal device initiates an RRC reestablishment procedure; and that the terminal device selects the target cell includes: The terminal device selects the target cell during running of the first timer.

In the foregoing technical solution, the terminal device considers, in a period of time by using a timer, whether a cell supports the expected network slice. This can prevent the terminal device from entering an idle mode because the terminal device cannot select a target cell for a long time.

With reference to any one of the first aspect and the foregoing possible implementations, in another possible implementation, the method further includes: The terminal device starts a first timer when the terminal device starts performing cell selection or cell reselection; and that the terminal device selects the target cell includes: The terminal device selects the target cell during running of the first timer.

In other words, the first timer is started when the terminal device starts selecting the target cell.

In the foregoing technical solution, the terminal device considers, in a period of time by using a timer, whether a cell supports the expected network slice. This can prevent the terminal device from entering an idle mode because the terminal device cannot select a target cell for a long time.

With reference to any one of the first aspect and the foregoing possible implementations, in another possible implementation, the method further includes: The terminal device stops the first timer when the target cell is selected.

With reference to any one of the first aspect and the foregoing possible implementations, in another possible implementation, the method further includes: After the first timer expires, the terminal device selects a cell that meets a cell selection condition or a cell reselection condition.

In other words, the terminal device considers, only during running of the first timer, whether the cell supports the expected network slice, and after the first timer expires, the terminal device no longer considers whether the cell supports the expected network slice.

With reference to any one of the first aspect and the foregoing possible implementations, in another possible implementation, duration of the first timer is less than duration of a second timer, and the second timer controls duration in which the terminal device performs RRC reestablishment.

Optionally, the terminal device starts the second timer when the terminal device initiates an RRC reestablishment procedure.

Optionally, the terminal device starts the second timer when the terminal device starts performing cell selection or cell reselection.

In other words, the second timer is started when the terminal device starts selecting the target cell.

With reference to any one of the first aspect and the foregoing possible implementations, in another possible implementation, the method further includes: The terminal device receives a fourth message from the first access network device or sent by a core network device, where the fourth message includes the duration of the first timer.

In other words, the duration of the first timer is configured for the terminal device, and is at a granularity of the terminal device.

With reference to any one of the first aspect and the foregoing possible implementations, in another possible implementation, the method further includes: The terminal device receives a fourth message from the first access network device or sent by a core network device, where the fourth message includes the duration of the first timer and an identifier of the expected network slice, and the first timer corresponds to the expected network slice.

Optionally, the terminal device determines, based on the fourth message, duration corresponding to the expected network slice.

In other words, the duration of the first timer is configured for the network slice, and is at a granularity of the network slice.

Optionally, the fourth message includes an identifier of at least one network slice and at least one piece of duration corresponding to the at least one network slice, the duration is the duration of the first timer, and the at least one network slice includes the expected network slice. In this case, the terminal device determines, from the at least one piece of duration, duration corresponding to the expected network slice.

Optionally, the terminal device determines that duration corresponding to the identifier of the expected network slice is the duration corresponding to the expected network slice.

Optionally, the terminal device may further preferably select, based on a priority of the at least one network slice, duration corresponding to a network slice with a high priority as the duration corresponding to the expected network slice.

For example, a network slice 1 corresponds to duration 1, a network slice 2 corresponds to duration 2, the network slice 2 is the expected network slice, and a priority of the network slice 1 is higher than a priority of the network slice 2. In this case, the terminal device determines the duration 1 as duration corresponding to the network slice 2.

With reference to any one of the first aspect and the foregoing possible implementations, in another possible implementation, that the terminal device selects the target cell during running of the first timer includes: When a first candidate cell does not support the expected network slice, the terminal device selects the target cell by using a cell selection process or a cell reselection process, where the first candidate cell is a cell that meets a cell selection condition or a cell reselection condition before the target cell is selected.

In other words, when selecting a cell that only meets the cell selection condition or the cell reselection condition but does not support the expected network slice, the terminal device continues performing a cell selection or cell reselection process, to preferably select a cell that supports the expected network slice.

With reference to any one of the first aspect and the foregoing possible implementations, in another possible implementation, the method further includes: The terminal device sends a seventh message to the second access network device, where the seventh message includes at least one piece of the following information: whether to initiate random access by using a cell that does not support the expected network slice; whether to initiate random access by using a cell that supports the expected network slice; whether the first timer expires; time from initiating RRC reestablishment to selecting the first available cell that supports the expected network slice; a quantity of transmission times of a preamble of the first available cell that supports the expected network slice; an identifier of the expected network slice; or an identifier of at least one cell that is selected during running of the first timer and that does not support the expected network slice.

Optionally, the available cell may be a cell that meets a cell selection condition or a cell reselection condition.

In the foregoing technical solution, the terminal device feeds back, to the access network device, information recorded in the RRC reestablishment procedure, so that the access network device can perform network planning optimization. This helps the terminal device subsequently access a network as soon as possible.

With reference to any one of the first aspect and the foregoing possible implementations, in another possible implementation, the method further includes: The terminal device sends a fifth message to a second access network device, where the fifth message requests the second access network device to broadcast configuration information of the expected network slice.

With reference to any one of the first aspect and the foregoing possible implementations, in another possible implementation, before the terminal device sends the request message to the second access network device, the method further includes: The terminal device receives a sixth message from the second access network device, where the sixth message indicates that the configuration information of the expected network slice is not broadcast.

According to a second aspect, this application provides an RRC reestablishment method. The method includes: A terminal device selects a target cell, where the target cell is a cell of an expected type; and the terminal device sends an RRC reestablishment request message by using the target cell.

Optionally, the cell of the expected type may be a non-terrestrial communication (non-terrestrial network, NTN) cell, a terrestrial communication (terrestrial network, TN) cell, a public network cell, a private network cell, or the like.

In the foregoing technical solution, when selecting a cell, the terminal device considers a type of the cell, so that the terminal device can preferentially select a cell of a specific type to initiate random access, thereby avoiding cell handover caused because an access cell is not a type that the terminal device expects to access. This helps reduce a delay of accessing a cell that supports the specific type by the terminal device.

Other embodiments in the second aspect are the same as or similar to embodiments in the first aspect, and technical effects that can be achieved are also the same as or similar to the technical effects that can be achieved by the embodiments in the first aspect. For details, refer to the descriptions in the first aspect. Details are not described herein again.

According to a third aspect, this application provides an RRC reestablishment method. The method includes: A second access network device receives a seventh message from a terminal device, where the seventh message includes at least one piece of the following information: whether to initiate random access by using a cell that does not support an expected network slice; whether to initiate random access by using a cell that supports the expected network slice; whether a first timer expires; time from initiating RRC reestablishment to selecting the first available cell that supports the expected network slice; a quantity of transmission times of a preamble of the first available cell that supports the expected network slice; an identifier of the expected network slice; or an identifier of at least one cell that is selected during running of the first timer and that does not support the expected network slice; and the second access network device determines configuration information of the RRC reestablishment based on the seventh message.

Optionally, the available cell may be a cell that meets a cell selection condition or a cell reselection condition.

In the foregoing technical solution, the terminal device feeds back, to the access network device, information recorded in the RRC reestablishment procedure, so that the access network device can perform network planning optimization. This helps the terminal device subsequently access a network as soon as possible.

With reference to the third aspect, in a possible implementation, the expected network slice is a network slice that the terminal device expects to access.

With reference to any one of the third aspect and the foregoing possible implementations, in another possible implementation, the expected network slice is a network slice corresponding to a PDU session established by the terminal device by using a first access network device, and the first access network device is a last serving access network device of the terminal device.

With reference to any one of the third aspect and the foregoing possible implementations, in another possible implementation, the method further includes: sending, by the second access network device, a first message to the terminal device, where the first message includes information used to indicate whether a target cell selected by the terminal device supports the expected network slice, and the target cell belongs to the second access network device.

With reference to the third aspect, in a possible implementation, before the second access network device receives the seventh message from the terminal device, the method further includes: The second access network device receives a fifth message from the terminal device, where the fifth message requests the second access network device to broadcast configuration information of the expected network slice.

With reference to any one of the third aspect and the foregoing possible implementations, in another possible implementation, before receiving the fifth message from the terminal device, the method further includes: The second access network device sends a sixth message to the terminal device, where the sixth message indicates that the configuration information of the expected network slice is not broadcast.

For detailed descriptions of embodiments in the third aspect, refer to the first aspect. Details are not described herein again.

According to a fourth aspect, this application provides an RRC reestablishment method. The method includes: A first access network device sends a second message to a terminal device, where the second message includes information about a first frequency, the first frequency supports an expected network slice, and the first access network device is a last serving access network device of the terminal device.

With reference to the fourth aspect, in a possible implementation, the second message further includes information about a second frequency, and the second frequency includes a cell that supports the expected network slice.

With reference to any one of the fourth aspect and the foregoing possible implementations, in another possible implementation, the second message further includes information about a third frequency, and the third frequency does not support the expected network slice.

With reference to any one of the fourth aspect and the foregoing possible implementations, in another possible implementation, the method further includes: The first access network device sends a third message to the terminal device, where the third message includes at least one cell identifier, a cell corresponding to the at least one cell identifier supports the expected network slice, and the at least one cell identifier includes an identifier of the target cell selected by the terminal device.

With reference to any one of the fourth aspect and the foregoing possible implementations, in another possible implementation, the method further includes: The first access network device sends a fourth message to the terminal device, where the fourth message includes the duration of the first timer.

With reference to any one of the fourth aspect and the foregoing possible implementations, in another possible implementation, the method further includes: The first access network device sends a fourth message to the terminal device, where the fourth message includes an identifier of at least one network slice and at least one piece of duration corresponding to the at least one network slice, the duration is the duration of the first timer, and the at least one network slice includes the expected network slice.

For detailed descriptions of embodiments in the fourth aspect, refer to the first aspect. Details are not described herein again.

According to a fifth aspect, this application provides a communication apparatus, including: a processing unit, configured to select a target cell, where the target cell supports an expected network slice; and a transceiver unit, configured to send an RRC reestablishment request message by using the target cell.

Optionally, the communication apparatus is a terminal device.

Optionally, the processing unit is specifically configured to: after detecting a radio link failure, a synchronous reconfiguration failure, an integrity check failure, an RRC connection reconfiguration failure, an inter-RAT handover failure, or the like, start selecting the target cell.

Optionally, the processing unit is specifically configured to: after selecting the target cell, complete selecting the target cell.

It should be noted that a process in which the terminal device selects the target cell may be a step in the RRC reestablishment procedure, or may not belong to the RCC reestablishment procedure. For example, the process in which the terminal device selects the target cell is before the RRC reestablishment process. In other words, the terminal device starts the RRC reestablishment procedure only after the terminal device selects the target cell.

In the foregoing technical solution, when selecting a cell, the terminal device considers whether the cell supports an expected network slice, so that the method is applicable to the communication system including the network slice. In addition, the terminal device selects a cell that supports a specific network slice to initiate random access, so that cell handover caused because an access cell does not support the network slice expected to be used by the terminal device can be avoided. This helps reduce a delay of accessing, by the terminal device, the cell that supports the specific network slice.

With reference to the fifth aspect, in a possible implementation, the expected network slice is a network slice that the terminal device expects to access.

With reference to any one of the fifth aspect and the foregoing possible implementations, in another possible implementation, the expected network slice is a network slice corresponding to a PDU session established by the terminal device by using a first access network device, and the first access network device is a last serving access network device of the terminal device.

In this embodiment, the terminal device selects the cell that supports the network slice corresponding to the PDU session that is established by using the first access network device. This can avoid a case in which the cell selected in the RRC reestablishment procedure does not support a service of the network slice, to help improve service continuity of the terminal device.

With reference to any one of the fifth aspect and the foregoing possible implementations, in another possible implementation, the transceiver unit is further configured to: receive a first message from a second access network device, where the first message includes information indicating that the target cell supports the expected network slice, and the second access network device is an access network device to which the target cell belongs.

The second access network device is an access network device to which the target cell belongs. In other words, a cell of the second access network device includes the target cell.

In the foregoing technical solution, the terminal device may determine, based on information from the second access network device, whether the cell supports the expected network, so that the terminal device can preferentially select a cell that supports a specific network slice to initiate random access, to avoid cell handover caused because an access cell does not support the network slice expected to be used by the terminal device. This helps reduce a delay of accessing, by the terminal device, the cell that supports the specific network slice.

Optionally, the first message may be a broadcast message, or may be dedicated signaling.

Optionally, the first message may be an RRC message, MAC signaling, or the like.

Optionally, the first message may further include information about whether a neighboring cell of the cell supports the expected network slice.

Optionally, the first message includes an identifier of one or more network slices supported by the cell.

With reference to any one of the fifth aspect and the foregoing possible implementations, in another possible implementation, the transceiver unit is further configured to: receive a second message from a first access network device, where the second message includes information about a first frequency, the first frequency supports the expected network slice, and the first access network device is a last serving access network device of the terminal device.

By using the foregoing technical solution, the terminal device can search for a cell in a specific frequency range, to accelerate selection of the target cell that supports the expected network slice. This helps reduce a delay of accessing, by the terminal device, the cell that supports the specific network slice.

Optionally, the second message includes a frequency list, and a frequency in the list supports the expected network slice.

Optionally, the second message may be a broadcast message, or may be dedicated signaling.

Optionally, the second message may be an RRC message, MAC signaling, or the like.

Optionally, that the first frequency supports the expected network slice may be understood as that all cells at the first frequency support the expected network slice. The terminal device determines that a candidate cell found on the first frequency supports the expected network slice.

Optionally, that the first frequency supports the expected network slice may be further understood as that a cell at the first frequency includes a cell that supports the expected network slice. In this case, because the candidate cell found on the first frequency may or may not support the expected network slice, after finding the candidate cell on the first frequency, the terminal device may further determine, based on the first message, whether the candidate cell supports the expected network slice.

For example, after the terminal device finds the candidate cell on the first frequency, the terminal device further reads system information of the candidate cell. The system information of the candidate cell includes information indicating whether the candidate cell supports the expected network slice. In this way, the terminal device can determine whether the candidate cell supports the expected network slice.

With reference to any one of the fifth aspect and the foregoing possible implementations, in another possible implementation, the transceiver unit is further configured to: receive, by the terminal device, a second message from a first access network device, where the second message includes information about a third frequency, the third frequency does not support the expected network slice, and the first access network device is a last serving access network device of the terminal device.

In the foregoing technical solution, the terminal device can perform cell search in a small frequency range, to accelerate selection of the target cell that supports the expected network slice. This helps reduce a delay of accessing, by the terminal device, the cell that supports the specific network slice.

Optionally, the second message may be a broadcast message, or may be dedicated signaling.

Optionally, the second message may be an RRC message, MAC signaling, or the like.

Optionally, the second message includes a frequency list, and a frequency in the list does not support the expected network slice.

With reference to any one of the fifth aspect and the foregoing possible implementations, in another possible implementation, the transceiver unit is further configured to: receive, by the terminal device, a third message from a first access network device, where the third message includes at least one cell identifier, a cell corresponding to the at least one cell identifier supports the expected network slice, the at least one cell identifier includes an identifier of the target cell, and the first access network device is a last serving access network device of the terminal device.

In the foregoing technical solution, the terminal device may determine, based on cell set information from the second access network device, whether the cell supports the expected network, so that when selecting a cell, the terminal device can determine whether the cell supports the expected network slice, and preferentially select a cell that supports a specific network slice to initiate random access, to avoid cell handover caused because an access cell does not support the network slice expected to be used by the terminal device. This helps reduce a delay of accessing, by the terminal device, the cell that supports the specific network slice.

Optionally, the third message includes a cell identifier list, and a cell corresponding to a cell identifier in the list supports the expected network slice.

Optionally, the third message may be a broadcast message, or may be dedicated signaling.

Optionally, the third message may be an RRC message, MAC signaling, or the like.

In an example, when an identifier of a cell belongs to the at least one cell identifier, the terminal device determines that the cell supports the expected network slice. When an identifier of a cell does not belong to the at least one cell identifier, the terminal device determines that the cell does not support the expected network slice.

With reference to any one of the fifth aspect and the foregoing possible implementations, in another possible implementation, the transceiver unit is further configured to: receive, by the terminal device, a third message from a first access network device, where the third message includes at least one cell identifier, a cell corresponding to the at least one cell identifier does not support the expected network slice, and the first access network device is a last serving access network device of the terminal device.

In the foregoing technical solution, the terminal device may determine, based on cell set information from the second access network device, whether the cell supports the expected network, so that when selecting a cell, the terminal device can determine whether the cell supports the expected network slice, and preferentially select a cell that supports a specific network slice to initiate random access, to avoid cell handover caused because an access cell does not support the network slice expected to be used by the terminal device. This helps reduce a delay of accessing, by the terminal device, the cell that supports the specific network slice.

Optionally, the third message includes a cell identifier list, and a cell corresponding to a cell identifier in the list does not support the expected network slice.

Optionally, the third message may be a broadcast message, or may be dedicated signaling.

Optionally, the third message may be an RRC message, MAC signaling, or the like.

In an example, when an identifier of a cell does not belong to the at least one cell identifier, the terminal device determines that the cell supports the expected network slice. When an identifier of a cell belongs to the at least one cell identifier, the terminal device determines that the cell does not support the expected network slice.

With reference to any one of the fifth aspect and the foregoing possible implementations, in another possible implementation, the processing unit is specifically configured to: select the target cell within a preset time period.

In other words, the terminal device considers, only within a preset time period, whether the cell supports the expected network slice, and beyond the preset time period, the terminal device does not consider whether the cell supports the expected network slice. This can prevent the terminal device from entering an idle mode because the terminal device cannot select a target cell for a long time.

With reference to any one of the fifth aspect and the foregoing possible implementations, in another possible implementation, the processing unit is further configured to:

start a first timer when the communication apparatus initiates an RRC reestablishment procedure; and the processing unit is specifically configured to: select, the target cell during running of the first timer.

In the foregoing technical solution, the terminal device considers, in a period of time by using a timer, whether a cell supports the expected network slice. This can prevent the terminal device from entering an idle mode because the terminal device cannot select a target cell for a long time.

With reference to any one of the fifth aspect and the foregoing possible implementations, in another possible implementation, the processing unit is further configured to: start a first timer when the terminal device starts performing cell selection or cell reselection; and the processing unit is specifically configured to: select the target cell during running of the first timer.

In other words, the first timer is started when the terminal device starts selecting the target cell.

In the foregoing technical solution, the terminal device considers, in a period of time by using a timer, whether a cell supports the expected network slice. This can prevent the terminal device from entering an idle mode because the terminal device cannot select a target cell for a long time.

With reference to any one of the fifth aspect and the foregoing possible implementations, in another possible implementation, the processing unit is further configured to: stop the first timer when the target cell is selected.

With reference to any one of the fifth aspect and the foregoing possible implementations, in another possible implementation, the processing unit is further configured to: after the first timer expires, select a cell that meets a cell selection condition or a cell reselection condition.

In other words, the terminal device considers, only during running of the first timer, whether the cell supports the expected network slice, and after the first timer expires, the terminal device no longer considers whether the cell supports the expected network slice.

With reference to any one of the fifth aspect and the foregoing possible implementations, in another possible implementation.

Duration of the first timer is less than duration of a second timer, and the second timer controls duration in which the terminal device performs RRC reestablishment.

Optionally, the terminal device starts the second timer when the terminal device initiates an RRC reestablishment procedure.

Optionally, the terminal device starts the second timer when the terminal device starts performing cell selection or cell reselection. With reference to any one of the fifth aspect and the foregoing possible implementations, in another possible implementation, the transceiver unit is further configured to: receive a fourth message from the first access network device or sent by a core network device, where the fourth message includes the duration of the first timer.

In other words, the duration of the first timer is configured for the terminal device, and is at a granularity of the terminal device.

With reference to any one of the fifth aspect and the foregoing possible implementations, in another possible implementation, the transceiver unit is further configured to: receive a fourth message from the first access network device or sent by a core network device, where the fourth message includes the duration of the first timer and an identifier of the expected network slice, and the first timer corresponds to the expected network slice.

Optionally, the terminal device determines, based on the fourth message, duration corresponding to the expected network slice.

In other words, the duration of the first timer is configured for the network slice, and is at a granularity of the network slice.

Optionally, the fourth message includes an identifier of at least one network slice and at least one piece of duration corresponding to the at least one network slice, the duration is the duration of the first tinier, and the at least one network slice includes the expected network slice. In this case, the terminal device determines, from the at least one piece of duration, duration corresponding to the expected network slice.

Optionally, the terminal device determines that duration corresponding to the identifier of the expected network slice is the duration corresponding to the expected network slice.

Optionally, the terminal device may further preferably select, based on a priority of the at least one network slice, duration corresponding to a network slice with a high priority as the duration corresponding to the expected network slice.

For example, a network slice 1 corresponds to duration 1, a network slice 2 corresponds to duration 2, the network slice 2 is the expected network slice, and a priority of the network slice 1 is higher than a priority of the network slice 2. In this case, the terminal device determines the duration 1 as duration corresponding to the network slice 2.

With reference to any one of the fifth aspect and the foregoing possible implementations, in another possible implementation, the processing unit is specifically configured to: when a first candidate cell does not support the expected network slice, select the target cell by using a cell selection process or a cell reselection process, where the first candidate cell is a cell that meets a cell selection condition or a cell reselection condition before the target cell is selected.

In other words, when selecting a cell that only meets the cell selection condition or the cell reselection condition but does not support the expected network slice, the terminal device continues performing a cell selection or cell reselection process, to preferably select a cell that supports the expected network slice.

With reference to any one of the fifth aspect and the foregoing possible implementations, in another possible implementation, the transceiver unit is further configured to: send a seventh message to the second access network device, where the seventh message includes at least one piece of the following information: whether to initiate random access by using a cell that does not support the expected network slice; whether to initiate random access by using a cell that supports the expected network slice; whether the first timer expires; time from initiating RRC reestablishment to selecting the first available cell that supports the expected network slice; a quantity of transmission times of a preamble of the first available cell that supports the expected network slice; an identifier of the expected network slice; or an identifier of at least one cell that is selected during running of the first timer and that does not support the expected network slice.

Optionally, the available cell may be a cell that meets a cell selection condition or a cell reselection condition.

In the foregoing technical solution, the terminal device feeds hack, to the access network device, information recorded in the RRC reestablishment procedure, so that the access network device can perform network planning optimization. This helps the terminal device subsequently access a network as soon as possible.

With reference to any one of the fifth aspect and the foregoing possible implementations, in another possible implementation, the transceiver unit is further configured to: send, by the terminal device, a fifth message to a second access network device, where the fifth message requests the second access network device to broadcast configuration information of the expected network slice.

With reference to any one of the fifth aspect and the foregoing possible implementations, in another possible implementation, before the terminal device sends the fifth message to the second access network device, the transceiver unit is further configured to: receive a sixth message from the second access network device, where the sixth message indicates that the configuration information of the expected network slice is not broadcast.

According to a sixth aspect, this application provides a communication apparatus, including: a processing unit, configured to select a target cell, where the target cell is a cell of an expected type; and a transceiver unit, configured to send an RRC reestablishment request message by using the target cell.

Optionally, the communication apparatus is a terminal device.

Optionally, the cell of the expected type may be an NTN cell, a TN cell, a public network cell, a private network cell, or the like.

In the foregoing technical solution, when selecting a cell, the terminal device considers a type of the cell, so that the terminal device can preferentially select a cell of a specific type to initiate random access, thereby avoiding cell handover caused because an access cell is not a type that the terminal device expects to access. This helps reduce a delay of accessing a cell that supports the specific type by the terminal device.

Other embodiments in the sixth aspect are the same as or similar to embodiments in the fifth aspect, and technical effects that can be achieved are also the same as or similar to the technical effects that can be achieved by the embodiments in the fifth aspect. For details, refer to the descriptions in the fifth aspect. Details are not described herein again.

According to a seventh aspect, this application provides a communication apparatus, including: a transceiver unit, configured to receive a seventh message from a terminal device, where the seventh message includes at least one piece of the following information: whether to initiate random access by using a cell that does not support an expected network slice; whether to initiate random access by using a cell that supports the expected network slice; whether a first timer expires; time from initiating RRC reestablishment to selecting the first available cell that supports the expected network slice; a quantity of transmission times of a preamble of the first available cell that supports the expected network slice; an identifier of the expected network slice; or an identifier of at least one cell that is selected during running of the first timer and that does not support the expected network slice; and a processing unit, configured to determine configuration information of the RRC reestablishment based on the seventh message.

Optionally, the communication apparatus is an access network device.

Optionally, the available cell may be a cell that meets a cell selection condition or a cell reselection condition.

In the foregoing technical solution, the terminal device feeds back, to the access network device, information recorded in the RRC reestablishment procedure, so that the access network device can perform network planning optimization. This helps the terminal device subsequently access a network as soon as possible.

With reference to the seventh aspect, in a possible implementation, the expected network slice is a network slice that the terminal device expects to access.

With reference to any one of the seventh aspect and the foregoing possible implementations, in another possible implementation, the expected network slice is a network slice corresponding to a PDU session established by the terminal device by using a first access network device, and the first access network device is a last serving access network device of the terminal device.

With reference to any one of the seventh aspect and the foregoing possible implementations, in another possible implementation, the transceiver unit is further configured to: send a first message to the terminal device, where the first message includes information used to indicate whether a target cell selected by the terminal device supports the expected network slice, and the target cell belongs to the second access network device.

With reference to the seventh aspect, in a possible implementation, before the access network device receives the seventh message from the terminal device, the transceiver unit is further configured to: receive a fifth message from the terminal device, where the fifth message requests the access network device to broadcast configuration information of the expected network slice.

With reference to any one of the seventh aspect and the foregoing possible implementations, in another possible implementation, before receiving the fifth message from the terminal device, the transceiver unit is further configured to: send a sixth message to the terminal device, where the sixth message indicates that the configuration information of the expected network slice is not broadcast.

For detailed descriptions of embodiments in the seventh aspect, refer to the fifth aspect. Details are not described herein again.

According to an eighth aspect, this application provides a communication apparatus, including: a transceiver unit, configured to send a second message to a terminal device, where the second message includes information about a first frequency, the first frequency supports an expected network slice, and the first access network device is a last serving access network device of the terminal device.

Optionally, the communication apparatus is an access network device.

With reference to the eighth aspect, in a possible implementation, the second message further includes information about a second frequency, and the second frequency includes a cell that supports the expected network slice.

With reference to any one of the eighth aspect and the foregoing possible implementations, in another possible implementation, the second message further includes information about a third frequency, and the third frequency does not support the expected network slice.

With reference to any one of the eighth aspect and the foregoing possible implementations, in another possible implementation, the transceiver unit is further configured to: send a third message to the terminal device, where the third message includes at least one cell identifier, a cell corresponding to the at least one cell identifier supports the expected network slice, and the at least one cell identifier includes an identifier of the target cell selected by the terminal device.

With reference to any one of the eighth aspect and the foregoing possible implementations, in another possible implementation, the transceiver unit is further configured to:

send a fourth message to the terminal device, where the fourth message includes the duration of the first timer.

With reference to any one of the eighth aspect and the foregoing possible implementations, in another possible implementation, the transceiver unit is further configured to: send a fourth message to the terminal device, where the fourth message includes an identifier of at least one network slice and at least one piece of duration corresponding to the at least one network slice, the duration is the duration of the first timer, and the at least one network slice includes the expected network slice.

For detailed descriptions of embodiments in the eighth aspect, refer to the fifth aspect. Details are not described herein again.

According to a ninth aspect, this application provides a communication apparatus. The communication apparatus includes a processor and a communication interface. The processor and the interface circuit are coupled to each other. The communication interface is configured to communicate with another device. The processor is configured to implement the method according to any one of the first aspect or the implementations of the first aspect, or implement the method according to any one of the second aspect or the implementations of the second aspect.

Optionally, the communication apparatus is a terminal device.

In a possible implementation, the communication apparatus further includes a memory, configured to store instructions executed by the processor, store input data required by the processor to run instructions, or store data generated after the processor runs instructions.

According to a tenth aspect, this application provides a communication apparatus. The communication apparatus includes a processor and a communication interface. The processor and the interface circuit are coupled to each other. The communication interface is configured to communicate with another device. The processor is configured to implement the method according to any one of the third aspect or the implementations of the third aspect, or implement the method according to any one of the fourth aspect or the implementations of the fourth aspect.

Optionally, the communication apparatus is an access network device.

In a possible implementation, the communication apparatus further includes a memory, configured to store instructions executed by the processor, store input data required by the processor to nm instructions, or store data generated after the processor runs instructions.

According to an eleventh aspect, this application provides a chip. The chip includes a processor and a communication interface, the processor and the interface circuit are coupled to each other, the communication interface is configured to communicate with another device, and the processor is configured to implement the method according to any one of the first aspect or the implementations of the first aspect, implement the method according to any one of the second aspect or the implementations of the second aspect, implement the method according to any one of the third aspect or the implementations of the third aspect, or implement the method according to any one of the fourth aspect or implementations of the fourth aspect.

In a possible implementation, the chip further includes a memory, configured to store instructions executed by the processor, store input data required by the processor to run instructions, or store data generated after the processor runs instructions.

According to a twelfth aspect, an embodiment of this application provides a computer program product. The computer program product includes computer instructions. When the computer instructions are executed, the method according to any one of the first aspect or the possible implementations of the first aspect is performed, or the method according to any one of the second aspect or the possible implementations of the second aspect is performed, or the method according to any one of the third aspect or the possible implementations of the third aspect is performed, or the method according to any one of the fourth aspect or the possible implementations of the fourth aspect is performed.

According to a thirteenth aspect, this application provides a computer-readable storage medium. The storage medium stores computer instructions. When the computer instructions are executed, the method according to any one of the first aspect or the possible implementations of the first aspect is performed, or the method according to any one of the second aspect or the possible implementations of the second aspect is performed, or the method according to any one of the third aspect or the possible implementations of the third aspect is performed, or the method according to any one of the fourth aspect or the possible implementations of the fourth aspect is performed.

According to a fourteenth aspect, an embodiment of this application provides a communication system. The communication system includes the communication apparatus according to the fifth aspect, the sixth aspect, or the ninth aspect, and the communication apparatus according to the seventh aspect, the eighth aspect, or the tenth aspect.

Based on the foregoing contents, when selecting a cell, the terminal device considers whether the cell supports an expected network slice, so that the method is applicable to a communication system including a network slice. In addition, the terminal device selects a cell that supports a specific network slice to initiate random access, so that cell handover caused because an access cell does not support the network slice expected to be used by the terminal device can be avoided. This helps reduce a delay of accessing, by the terminal device, the cell that supports the specific network slice.

DESCRIPTION OF EMBODIMENTS

Figure 1:
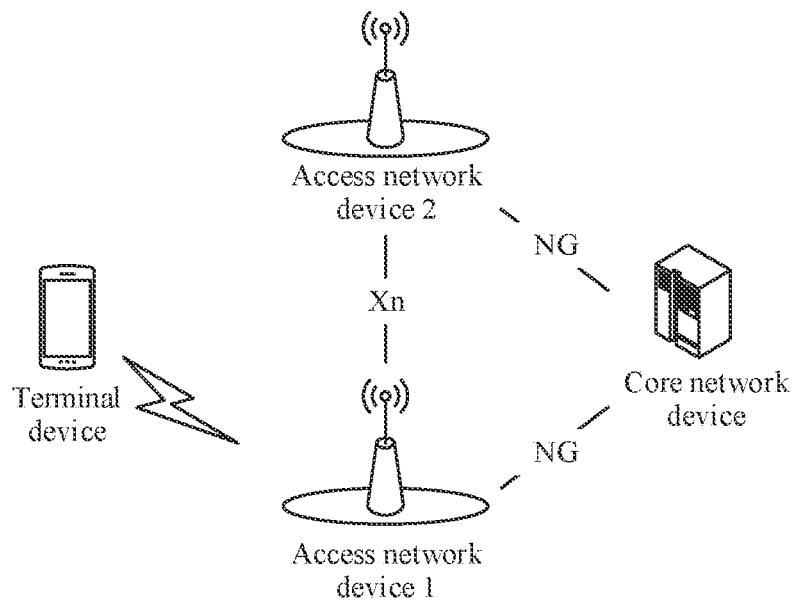
FIG. 1 is a schematic diagram of a possible network architecture to which an embodiment of this application may be applied.

The following describes technical solutions of this application with reference to accompanying drawings.

The technical solutions in embodiments of this application may be used in various communication systems, for example, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a 5G communication system, and a future new radio (new radio, NR) communication system.

In embodiments of this application, a terminal device may be a terminal, user equipment (user equipment, UE), an access terminal, a subscriber unit, a subscriber station, a mobile station, a remote station, a remote terminal, a mobile device, a user terminal, a wireless communication device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a 5G network, a terminal device in a future evolved public land mobile network (public land mobile network, PLMN), or the like. This is not limited in embodiments of this application.

An access network device in embodiments of this application may be a device configured to communicate with the terminal device, and the access network device may be an evolved NodeB (evolved NodeB, eNB, or eNodeB) in an LTE system, or a radio controller in a cloud radio access network (cloud radio access network, CRAN) scenario. Alternatively, the access network device may be a relay station, an access point, a vehicle-mounted device, a wearable device, an access network device in a future 5G network or an access network device in a future evolved PLMN network, or one antenna panel or a group of antenna panels (including a plurality of antenna panels) of a base station in a 5G system. Alternatively, the access network device may be a network node that constitutes a gNB or a transmission point, for example, a baseband unit (baseband unit, BBU) or a distributed unit (distributed unit, DU). This is not limited in embodiments of this application.

In some deployments, a gNB may include a centralized unit (centralized unit, CU) and a DU. The gNB may further include an active antenna unit (active antenna unit, AAU). The CU implements some functions of the gNB, and the DU implements some functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a MAC layer, and a physical (physical, PHY) layer. The AAU implements some physical layer processing functions, radio frequency processing, and a function related to an active antenna. Information at the RRC layer finally becomes information at the PHY layer, or is converted from information at the PHY layer. Therefore, in this architecture, higher layer signaling such as RRC layer signaling may also be considered to be sent by the DU, or sent by the DU and the AAU. It may be understood that the access network device may be a device including one or more of a CU node, a DU node, and an AAU node.

In embodiments of this application, the terminal device or the access network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (also referred to as a main memory). The operating system may be any one or more types of computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device, the access network device, or a function module that can invoke and execute the program and that is in the terminal device or the access network device.

In addition, aspects or features of this application may be implemented as a method, an apparatus, or a product that uses standard programming and/or engineering technologies. For example, the computer-readable medium may include but is not limited to: a magnetic storage component (for example, a hard disk, a floppy disk or a magnetic tape), an optical disc (for example, a compact disc (compact disc, CD) and a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine readable media" may include but is not limited to a radio channel, and various other media that can store, contain and/or carry instructions and/or data.

FIG. 1 is a schematic diagram of a possible network architecture to which an embodiment of this application may be applied. As shown in FIG. 1, the network architecture may include a terminal device, an access network device (for example, an access network device 1 and an access network device 2 in FIG. 1), and a core network device. The terminal device is connected to the access network device in a wireless manner, the access network devices are connected to each other through an Xn interface, and the access network device is connected to the core network device through an NG interface. The terminal device may be located at a fixed position, or may be mobile. It should be understood that, FIG. 1 is only a schematic diagram. The network architecture may further include another network device, for example, may further include a wireless relay device and a wireless backhaul device. Quantities of terminal devices, access network devices, and core network devices included in the network architecture are not limited in embodiments of this application.

The following describes terms used in this application.

1. Network Slice

Network slicing is a logic-based concept, and is reorganization of resources. In a 5G communication system, a plurality of isolated logical subnets with different characteristics may be virtualized on a same physical facility, to provide a targeted service for a user. Different logical subnets are identified and distinguished between by using pieces of single network slice selection assistance information (single network slice selection assistance information, S-NSSAI). The S-NSSAI may include a network slice/service type (slice/service type, SST) and a slice differentiator (slice differentiator, SD), and the SD is optional. The SST indicates a specific feature and service type of a network slice. As a supplement to the SST, the SD may further distinguish between a plurality of network slices that meet a same SST.

From a perspective of a system, a network slice that can be supported by the access network device uses a tracking area (tracking area, TA) as a granularity. If different cells of different access network devices or different cells of a same access network device belong to a same TA, network slices supported by these cells are the same. If the cells belong to different TAs, network slices supported by these cells may be the same or different.

2. Public Network and Private Network

Public network: The public network is a public land mobile network (public land mobile network, PLMN) established and operated by a government or an operator approved by the government, to provide land mobile communication services for the public. The PLMN ID includes a mobile country code (mobile country code, MCC) and a mobile network code (mobile network code, MNC). The MCC uniquely identifies a country to which a mobile subscriber belongs. For example, an MCC of China is 460. The MNC uniquely identifies a network in the country. For example, an MNC of a GSM network of China Mobile is 00, and an MNC of a GSM network of China Unicorn is 01. In daily life, the public network provides a network service for the terminal device.

Private network: Carriers or private users may set up private networks to meet user requirements. The private network may also be referred to as a non-public network (non-public network, NPN), and is a network open to a specific user, for example, an enterprise private network that serves only employees of the company. Private networks are classified into two types. One is a non-stand-alone private network (non-stand-alone non-public network, NSNPN), which uses part of the public network as network resources. A PLMN ID of the NSNPN is the same as that of an attached public network. The other is an independent private network (stand-alone non-public network, SNPN), which does not depend on network functions of the public network. According to an existing communication protocol, an MCC of a PLMN ID of the SNPN is 999, and the MNC is not defined.

3. Non-Terrestrial Communication (Non-Terrestrial Network, NTN) and Terrestrial Communication (Terrestrial Network, TN)

The NTN is also referred to as satellite communication. The NTN uses artificial earth satellites as relay stations to forward radio waves, to implement communication between two or more earth stations. In the NTN, because a distance between the access network device and the terminal device is long, a delay of NTN network service transmission is long. In comparison, a delay of TN network service transmission is short. Therefore, a service that has a high requirement on a delay is preferentially transmitted over a TN network.

4. Cell Selection

The terminal device performs a cell search process, and selects a suitable cell to camp on as soon as possible. This process is referred to as cell selection. In the cell search process, the terminal device reads system information of a found cell, to obtain parameters such as $Q_{rxlevmeas}$, $Q_{rxlevmin}$, and $Q_{rxlevminoffset}$. The terminal device evaluates, according to a criterion S, whether the found cell is a suitable cell.

The S criterion is as follows:

$Srxlev > 0$ $Srxlev = Q_{rxlevmeas} - Q_{rxlevmin} - P_{compensation}$ $P_{compensation} = \max(P_{EMAX} - P_{UMAX}, 0)$, where:
- a cell selection receive level value (cell selection RX level value, Srxlev) refers to a level value (dB) obtained through calculation during cell selection or reselection;
- $Q_{rxlevmeas}$ is a received signal strength value obtained by the terminal device through measurement, where the value is measured reference signal received power (reference signal received power, RSRP) (dBm);
- $Q_{rxlevmin}$ is a minimum received signal strength required by the cell, where the value is indicated by a system information block 1 (system information block 1, SIB 1) (dBm);
- $P_{EMAX}$ is a maximum allowed transmit power that is set by a system when the terminal device accesses a cell; and
- $P_{UMAX}$ is a maximum output power specified based on a level of the terminal device, and is a maximum power that can be actually transmitted by the terminal device.
- $Q_{rxlevminOffset}$ is used to offset $Q_{rxlevmin}$, and is valid only when the terminal device normally camps on a visited PLMN (visited public land mobile network, VPLMN) and periodically performs cell selection evaluation of a high-priority PLMN.

In other words, when Srxlev of the cell is greater than 0, it indicates that the cell is a suitable cell, in other words, a cell suitable for camping. Once a suitable cell (namely, a cell that meets the S criterion) is found, the cell selection process is completed. If a currently found cell is not a suitable cell (where to be specific, the cell is a cell that does not meet the S criterion), the terminal device continues to perform cell search until the terminal device finds a suitable cell and camps on the cell.

Through the cell selection process, the terminal device can find the suitable cell to camp on as soon as possible.

For ease of description, the foregoing criterion S is referred to as a cell selection condition below, and a cell that meets the foregoing criterion S is referred to as a cell that meets the cell selection condition.

5. Cell Reselection

After the terminal device camps on a cell, with movement of the terminal device, the terminal device may need to move to another cell having a higher priority or better signal strength for camping. This is a cell reselection process. A purpose of cell selection is to find a suitable cell as soon as possible, and a purpose of cell reselection is to select a more suitable cell.

For a purpose of power saving, the following specifications are made for cell measurement of the terminal device in a protocol:

The terminal device keeps measuring a frequency layer or a system whose priority is higher than that of a serving cell; and if Srxlev of the serving cell $\leq S_{intrasearch}$, the terminal device starts measurement on an intra-frequency cell; or if Srxlev of the serving cell $\leq S_{nonintrasearch}$, or $S_{nonintrasearch}$ is not configured, the terminal device starts measurement on a frequency and system with a same priority or a frequency and system with a lower priority, where $S_{intrasearch}$ is an intra-frequency measurement threshold, and $S_{nonintrasearch}$ is an inter-frequency measurement threshold.

After the measurement, the terminal device determines whether to perform cell reselection to a new cell, where reselection criteria are as follows:

(1) a reselection criterion for a high-priority frequency or system is that: Srxlev of a target frequency cell>$Thresh_{x,high}$ for duration of $Treselection_{RAT}$, where $Thresh_{x,high}$ is a high-priority reselection threshold, and $Treselection_{RAT}$ is duration of a cell reselection timer;

(2) a reselection criterion for a low-priority frequency or system is that: Srxlev of a serving cell<$Thresh_{serving,low}$, and Srxlev of a target frequency cell>$Thresh_{x,low}$ duration of $Treselection_{RAT}$, where $Thresh_{serving,low}$ is a reselection threshold of a low-priority serving frequency, and $Thresh_{x,low}$ is a low-priority reselection threshold; and (3) a reselection criterion for frequencies or systems with the same priority is based on a ranking (Ranking) criterion for intra-frequency cell reselection, where the ranking criterion is defined as follows:

$R_s = Q_{meas,s} + Q_{hyst} - Qoffset_{temp}$ $R_n = Q_{meas,n} - Qoffset - Qoffset_{temp}$, where $R_s$ is a ranking value of a current serving cell; $R_n$ is a ranking value of a neighboring cell; $Q_{hyst}$ is a hysteresis value used to prevent ping-gong reselection; $Q_{meas}$ is a received signal strength value of a cell obtained by the terminal device through measurement, where a maximum of N beams (beams) whose signal strength of each cell is higher than a threshold are used to generate a cell quality (cell quality), and the cell quality is used as $Q_{meas}$ after layer 3 filtering, where the threshold and N are notified to the terminal device in a broadcast message; $Qoffset_{temp}$ is an additional offset for cell selection and cell reselection; and Qoffset is $Qoffset_{s,n}$ in case of intra-frequency, and Qoffset is $Qoffset_{s,n} + Qoffset_{frequency}$ in case of inter-frequency, where $Qoffset_{s,n}$ is an offset between two cells, and $Qoffset_{frequency}$ is a frequency offset of NR frequencies with equal priorities.

In this case, the terminal device sorts ranking values of all cells that meet the cell selection criterion S (for detailed descriptions, refer to the foregoing descriptions). During reselection, instead of simply reselecting a cell with a best ranking, a highest ranking value during sorting is found, and cells whose difference from the highest ranking value is within a specific range (for example, x dB, where x is configurable) are considered as similar (similar) cells. In these similar cells, the terminal device reselects a cell with a largest quantity of good beams (good beams), where a beam (beam) greater than a threshold is considered as a good beam.

In addition, configuration parameters related to a currently camped cell and a neighboring cell are broadcast in a system message of the currently camped cell, so that the terminal device can obtain parameters such as $R_s$ and $R_n$ through calculation. For a high/low-priority frequency or system, if a plurality of cells meet the requirement, the cells need to be sorted.

For ease of description, the foregoing reselection criterion is referred to as a cell reselection condition below; and a cell that meets the foregoing reselection criterion is referred to as a cell that meets the cell reselection condition.

6. RRC Reestablishment Procedure (RRC Reestablishment Procedure)

When an RRC connection established between the terminal device and the network device is in an RRC connected mode, if a case such as a radio link failure, a synchronous reconfiguration failure, an integrity check failure, an RRC connection reconfiguration failure, or an inter-RAT handover failure occurs, an RRC reestablishment procedure is triggered. This process aims to reestablish the RRC connection between the terminal device and the network device, including restoration of an operation related to a signaling radio bearer 1 (signaling radio bearer 1, SRB 1) and secure reactivation, to ensure service continuity. The RRC reestablishment procedure is also referred to as an RRC connection reestablishment procedure, and the two are not distinguished between in this application.

In this application, a last serving access network device (last serving gNB) (also referred to as a previous access network device, a former access network device, a source access network device, an old access network device, or the like) of the terminal device is referred to as a first access network device, and an access network device to which a target cell selected by the terminal device in the RRC reestablishment procedure belongs is referred to as a second access network device.

When the terminal device performs cell selection in the RRC reestablishment procedure, once selecting a cell that meets a cell selection condition, the terminal device initiates a random access process by using the cell, to reestablish an RRC connection. In other words, the terminal device selects the cell that meets the cell selection condition. In a 5G communication system, a network slice is introduced. In this case, how to ensure RRC reestablishment is a problem worth considering.

For the foregoing problem, this application provides an RRC reestablishment method and an apparatus, to be applicable to a communication system including a network slice.

Figure 2:
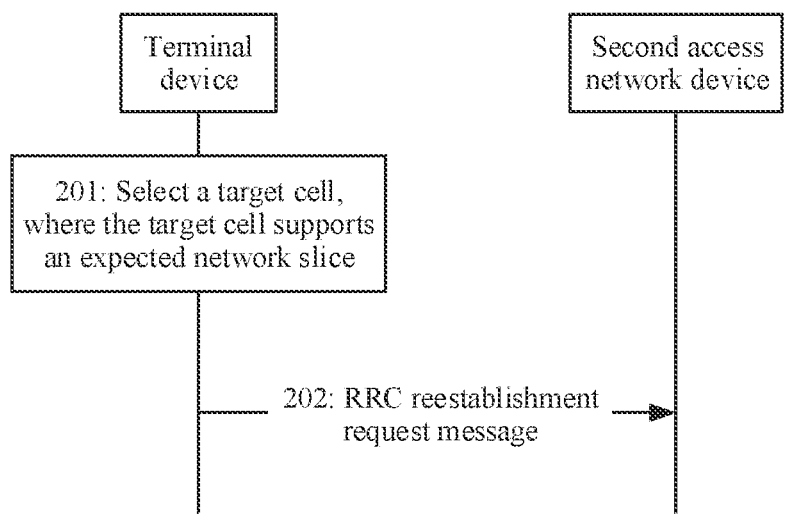
FIG. 2 is a schematic flowchart of an RRC reestablishment method according to an embodiment of this application.

FIG. 2 is a schematic flowchart of an RRC reestablishment method according to an embodiment of this application. The method shown in FIG. 2 may be performed by a terminal device or a second access network device, or may be performed by a module or a chip of a terminal device or a module or a chip of a second access network device. The following uses an example in which an execution body is the terminal device and the second access network device for description.

In 201, the terminal device selects a target cell, where the target cell supports an expected network slice.

Optionally, when the terminal device in an RRC connected mode detects a radio link failure, a synchronous reconfiguration failure, an integrity check failure, an RRC connection reconfiguration failure, an inter-RAT handover failure, or the like, the terminal device may initiate an RRC reestablishment procedure.

In the RRC reestablishment procedure, the terminal device selects the target cell, where the target cell supports the expected network slice. In other words, the terminal selects a cell that supports the expected network slice as the target cell.

It should be noted that a process in which the terminal device selects the target cell may be a step in the RRC reestablishment procedure, or may not belong to the RCC reestablishment procedure. For example, the process in which the terminal device selects the target cell is before the RRC reestablishment process. In other words, the terminal device starts the RRC reestablishment procedure only after the terminal device selects the target cell.

A specific implementation in which the terminal device selects the target cell is described in detail below.

In 202, the terminal device sends an RRC reestablishment request message by using the target cell. In other words, the terminal device initiates, by using the target cell, a random access process of RRC reestablishment to a second access network device to which the target cell belongs.

In some embodiments, the expected network slice is a network slice that terminal device expects to access (intended slice).

In an example, a network slice associated with a PDU session to be initiated by the terminal device is the network slice that the terminal device expects to access.

For example, the terminal device does not establish a PDU session of a network slice by using a first access network device. However, in the RRC reestablishment procedure performed by the terminal device, data of the network slice arrives at the terminal device, and the terminal device needs to send the data to a core network device. The network slice is the network slice that the terminal device expects to access.

For another example, the terminal device does not establish a PDU session of a network slice by using a first access network device. However, before the terminal device initiates RRC reestablishment, data of the network slice arrives at the terminal device, and the terminal device needs to send the data to a core network device. The network slice is the network slice that the terminal device expects to access.

In another example, the network slice that the terminal device expects to access is a network slice requested by the terminal device. Optionally, the network slice requested by the terminal device may be a network slice configured in the terminal device by default.

In some other embodiments, the expected network slice is a network slice, namely, an ongoing network slice (ongoing slice), corresponding to a PDU session established by the terminal device by using the first access network device. Optionally, the PDU session established by using the first access network device may be a PDU session used by the terminal device before initiating RRC reestablishment.

The expected network slice in this embodiment of this application may be any one of the following: a network slice (subscribed S-NSSAI) to which the terminal device subscribes, a network slice (allowed NSSAI) that the network device allows the terminal device to access, a network slice (configured NSSAI) configured by the network device for the terminal device, or a network slice (requested NSSAI) requested by the terminal device.

In this embodiment of this application, when selecting a cell, the terminal device considers whether the cell supports the expected network slice, so that the method is applicable to the communication system including the network slice. In addition, because different cells may support different network slices, a cell that meets the cell selection condition and that is selected by the terminal device may not support the network slice expected by the terminal device. After the terminal device reestablishes the RRC connection by using a cell that does not support the network slice expected by the terminal device, the terminal device performs cell handover until handing over to a cell that meets the cell selection condition and supports the network slice expected by the terminal device. Consequently, an access delay of the terminal device is long. According to the technical solutions of this application, the terminal device selects the cell that supports the expected network slice, to avoid a case in which the cell selected in the RRC reestablishment procedure does not support a service of the network slice, and help improve service continuity of the network slice or reduce a service delay of the network slice.

Figure 3:
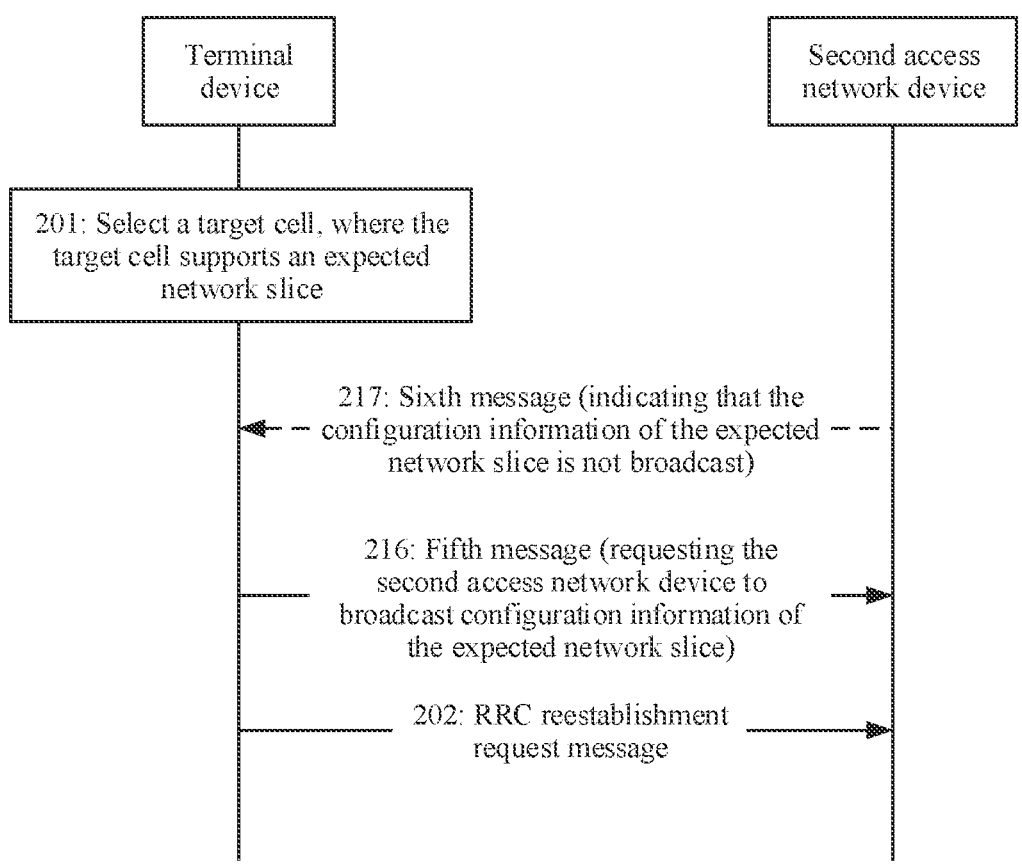
FIG. 3 is a schematic flowchart of an RRC reestablishment method according to another embodiment of this application.

FIG. 3 is a schematic flowchart of an RRC reestablishment method according to another embodiment of this application. The method shown in FIG. 3 may be performed by a terminal device or a second access network device, or may be performed by a module or a chip of a terminal device or a module or a chip of a second access network device. The following uses an example in which an execution body is the terminal device and the second access network device for description. For steps 201 and 202 in FIG. 3, refer to related descriptions in FIG. 2. Details are not described herein again.

As shown in FIG. 3, after step 201, the terminal device and the second access network device may further perform step 216. To be specific, the terminal device sends a fifth message to the second access network device. Correspondingly, the second access network device receives the fifth message from the terminal device, where the fifth message requests the second access network device to broadcast configuration information of the expected network slice. After receiving the fifth message, the second access network device may broadcast the configuration information of the expected network slice in the target cell. The configuration information of the network slice includes at least one of the following: a two-step random access preamble, a two-step random access time-frequency resource, a four-step random access preamble, a four-step random access time-frequency resource, a random access power ramping step (power ramping step), a backoff scaling factor, or the like.

For example, after selecting the target cell, if the terminal device determines that the second access network device does not broadcast the configuration information of the expected network slice in the target cell, the terminal device may send the fifth message to the second access network device, to request the second access network device to broadcast the configuration information of the expected network slice.

By using the foregoing technical solution, the access network device may broadcast the configuration information of the expected network slice only when receiving the request of the terminal device. This helps reduce energy consumption of the access network device.

Optionally, the terminal device may determine, based on an indication of the second access network device, that the second access network device does not broadcast the configuration information of the expected network slice in the target cell. In other words, before the terminal device sends the fifth message to the second access network device, step 217 may be further performed. To be specific, the terminal device receives a sixth message from the second access network device, where the sixth message indicates, to the terminal device, that the configuration information of the expected network slice is not broadcast.

Optionally, the sixth message may further include information indicating a transmission resource of the fifth message.

It should be noted the fifth message may request, by indicating in a manner of a message type, including a related information element, an indirect indication, or the like, the second access network device to broadcast the configuration information of the expected network slice. This is not specifically limited in this embodiment of this application. Similarly, the sixth message may indicate, to the terminal device in a manner of a message type, including a related information element, an indirect indication, or the like, that the configuration information of the expected network slice is not broadcast. This is not specifically limited in this embodiment of this application.

The following describes some other specific implementations in which the terminal device selects the target cell in this application with reference to FIG. 4 to FIG. 11.

In some embodiments, when selecting a cell, the terminal device considers whether a found candidate cell supports the expected network slice. To be specific, the terminal device selects a cell that supports the expected network slice. In this case, the target cell may meet a cell selection condition or a cell reselection condition, or may not meet a cell selection condition or a cell reselection condition.

The terminal device may determine, in many manners, whether the candidate cell supports the expected network slice. This is not specifically limited in this embodiment of this application.

Figure 4:
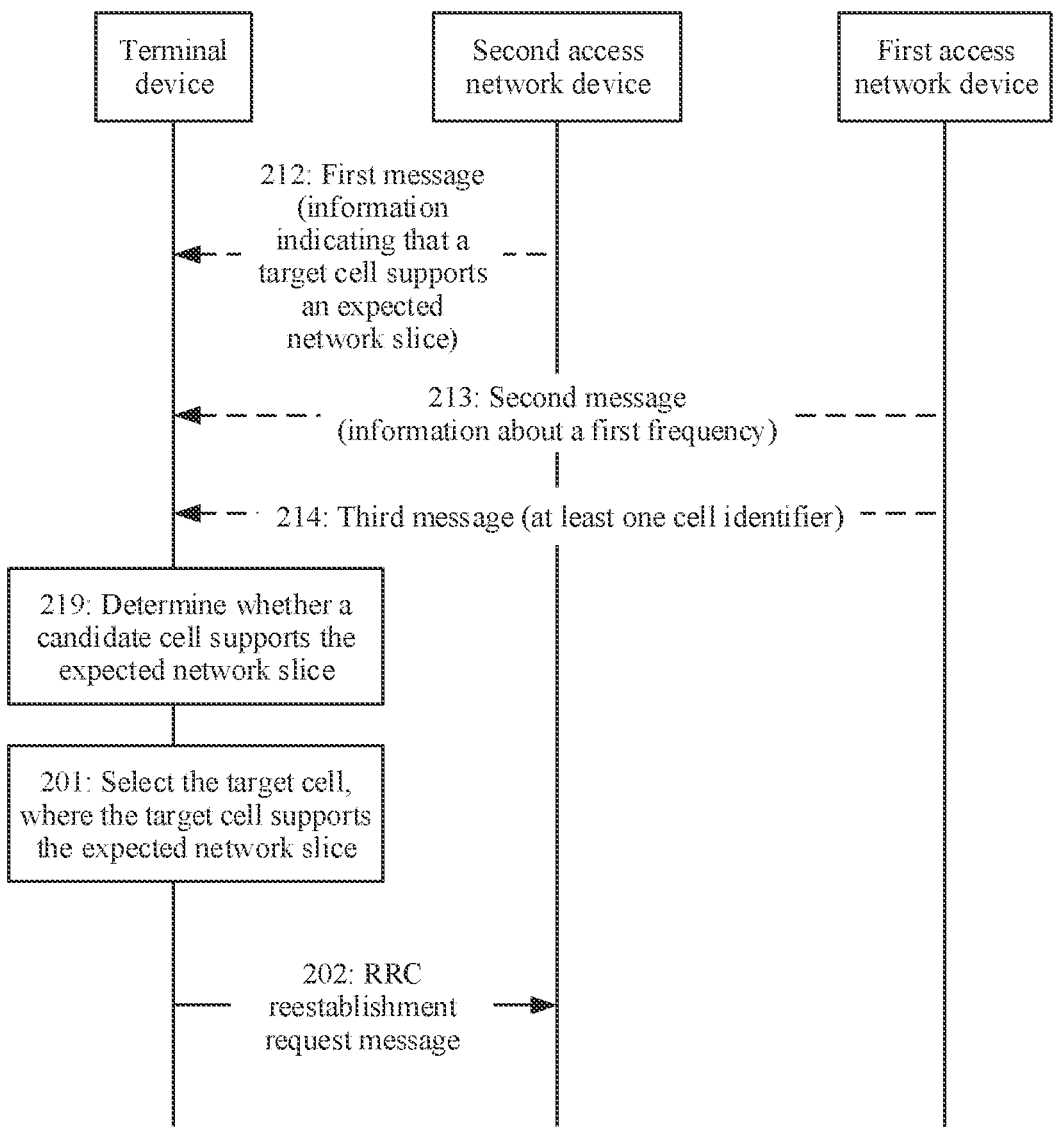
FIG. 4 is a schematic flowchart of an RRC reestablishment method according to another embodiment of this application.

In a possible implementation, as shown in FIG. 4, the terminal device and the second access network device may perform step 212. To be specific, the second access network device sends a first message to the terminal device. Correspondingly, the terminal device receives the first message sent by the second access network device, where the first message includes information indicating whether the candidate cell supports the expected network slice. In step 219, after receiving the first message, the terminal device determines whether a found candidate cell supports the expected network slice.

Optionally, the first message may be an RRC message, MAC signaling, or the like.

Optionally, the first message may be a broadcast system message (for example, a SIB 1), or may be dedicated signaling. This is not limited in this embodiment of this application.

Optionally, the first message may further include information about whether a neighboring cell of the candidate cell supports the expected network slice.

Optionally, the first message includes an identifier of one or more network slices supported by the candidate cell.

It should be noted that, that the first message includes the information indicating whether the candidate cell supports the expected network slice may be that the first message directly includes a related information element, or the first message may perform indication in an indirect manner. This is not specifically limited in this embodiment of this application.

In a possible implementation, as shown in FIG. 4, the terminal device and the first access network device may perform step 213. To be specific, the first access network device sends a second message to the terminal device. Correspondingly, the terminal device receives the second message sent by the first access network device. In step 219, after receiving the second message, the terminal device determines whether a found candidate cell supports the expected network slice.

In an example, the second message includes information about at least one frequency, and the at least one frequency supports the expected network slice; and the terminal device searches for a candidate cell on the at least one frequency.

Optionally, that the first frequency supports the expected network slice may be understood as that all cells at the first frequency support the expected network slice. The terminal device considers that a candidate cell found on the first frequency supports the expected network slice.

Optionally, that at least one frequency supports the expected network slice may be further understood as that cells at the at least one frequency include a cell that supports the expected network slice. In this case, because the candidate cell found on the at least one frequency may or may not support the expected network slice, after finding the candidate cell on the at least one frequency, the terminal device may further determine, based on the first message, whether the candidate cell supports the expected network slice.

For example, after the terminal device finds the candidate cell on the at least one frequency, the terminal device further reads system information of the candidate cell. The system information of the candidate cell includes information indicating whether the candidate cell supports the expected network slice. In this way, the terminal device can determine whether the candidate cell supports the expected network slice.

By using the foregoing technical solution, the terminal device can search for a cell in a specific frequency range, to accelerate selection of the target cell that supports the expected network slice. This helps reduce a delay of accessing, by the terminal device, the cell that supports the specific network slice.

In another example, the second message includes information about at least one frequency, and the at least one frequency does not support the expected network slice. The terminal device does not perform cell search on the at least one frequency.

By using the foregoing technical solution, the terminal device can perform cell search in a small frequency range, to accelerate selection of the target cell that supports the expected network slice. This helps reduce a delay of accessing, by the terminal device, the cell that supports the specific network slice.

Optionally, the second message includes a frequency list, and a frequency in the list supports the expected network slice, or a frequency in the list does not support the expected network slice.

Optionally, the second message may be an RRC message (for example, an RRC reconfiguration message (RRC reconfiguration)), MAC signaling, or the like.

Optionally, the second message may be a broadcast message, or may be dedicated signaling. This is not limited in this embodiment of this application.

It should be noted that, that the second message includes the information about the at least one frequency may be that the second message directly includes a related information element, or the second message may perform indication in an indirect manner. This is not specifically limited in this embodiment of this application.

In a possible implementation, as shown in FIG. 4, the terminal device and the first access network device may perform step 214. To be specific, the first access network device sends a third message to the terminal device. Correspondingly, the terminal device receives the third message sent by the first access network device. In step 219, after receiving the third message, the terminal device determines whether a found candidate cell supports the expected network slice.

In an example, the third message includes at least one cell identifier, a cell corresponding to the at least one cell identifier supports the expected network slice, and the terminal device determines whether an identifier of a candidate cell is in the at least one cell identifier. If the identifier of the candidate cell belongs to the at least one cell identifier, the terminal device determines that the candidate cell supports the expected network slice, that is, the candidate cell is a target cell, and the terminal device may send an RRC reestablishment request by using the candidate cell. If the identifier of the candidate cell does not belong to the at least one cell identifier, the terminal device determines that the candidate cell does not support the expected network slice, and the terminal device continues cell search.

In another example, the third message includes at least one cell identifier, a cell corresponding to the at least one cell identifier does not support the expected network slice, and the terminal device determines whether an identifier of a candidate cell is in the at least one cell identifier. If the identifier of the candidate cell belongs to the at least one cell identifier, the terminal device determines that the candidate cell does not support the expected network slice, and the terminal device continues cell search. If the identifier of the candidate cell does not belong to the at least one cell identifier, the terminal device determines that the candidate cell supports the expected network slice, and the terminal device may send an RRC reestablishment request by using the candidate cell.

Optionally, the third message includes a cell identifier list, and a cell corresponding to a cell identifier in the list does not support the expected network slice, or a cell corresponding to a cell identifier in the list supports the expected network slice.

Optionally, the cell identifier may be a physical cell identifier (physical cell identifier, PCI).

Optionally, the third message may be an RRC message (for example, an RRC reconfiguration message (RRC reconfiguration)), MAC signaling, or the like.

Optionally, the third message may be a broadcast message, or may be dedicated signaling. This is not limited in this embodiment of this application.

It should be noted that, that the third message includes the at least one cell identifier may be that the third message directly includes a related information element, or the third message may perform indication in an indirect manner. This is not specifically limited in this embodiment of this application.

In some other embodiments, when selecting a target cell, the terminal device considers whether a found candidate cell supports the expected network slice and whether the found candidate cell meets a cell selection condition or a cell reselection condition. In other words, the terminal device selects a cell that supports the expected network slice and meets the selection or cell reselection condition. In other words, the target cell supports the expected network slice and meets the cell selection or cell reselection condition.

Optionally, when performing step 201, the terminal device may refer to both a result of step 219 and a result of cell selection or cell reselection.

It should be noted that, that the terminal device selects the target cell may be understood as follows: The terminal device starts selecting the target cell; and the terminal device selects the target cell. Optionally, that the terminal device starts selecting the target cell may include: The terminal device starts selecting the target cell through cell selection or cell reselection. That the terminal device selects the target cell includes: The terminal device selects the target cell through cell selection or cell reselection. The terminal device may start selecting the target cell before or after step 219. The target cell selected by the terminal device in this application may be a cell selected in a cell selection process, or may be a cell selected in a cell reselection process.

The following describes a process in which the terminal device selects the target cell by using an example in which the terminal device selects a target cell that supports the expected network slice and that meets the cell selection or cell reselection condition.

Figure 5:
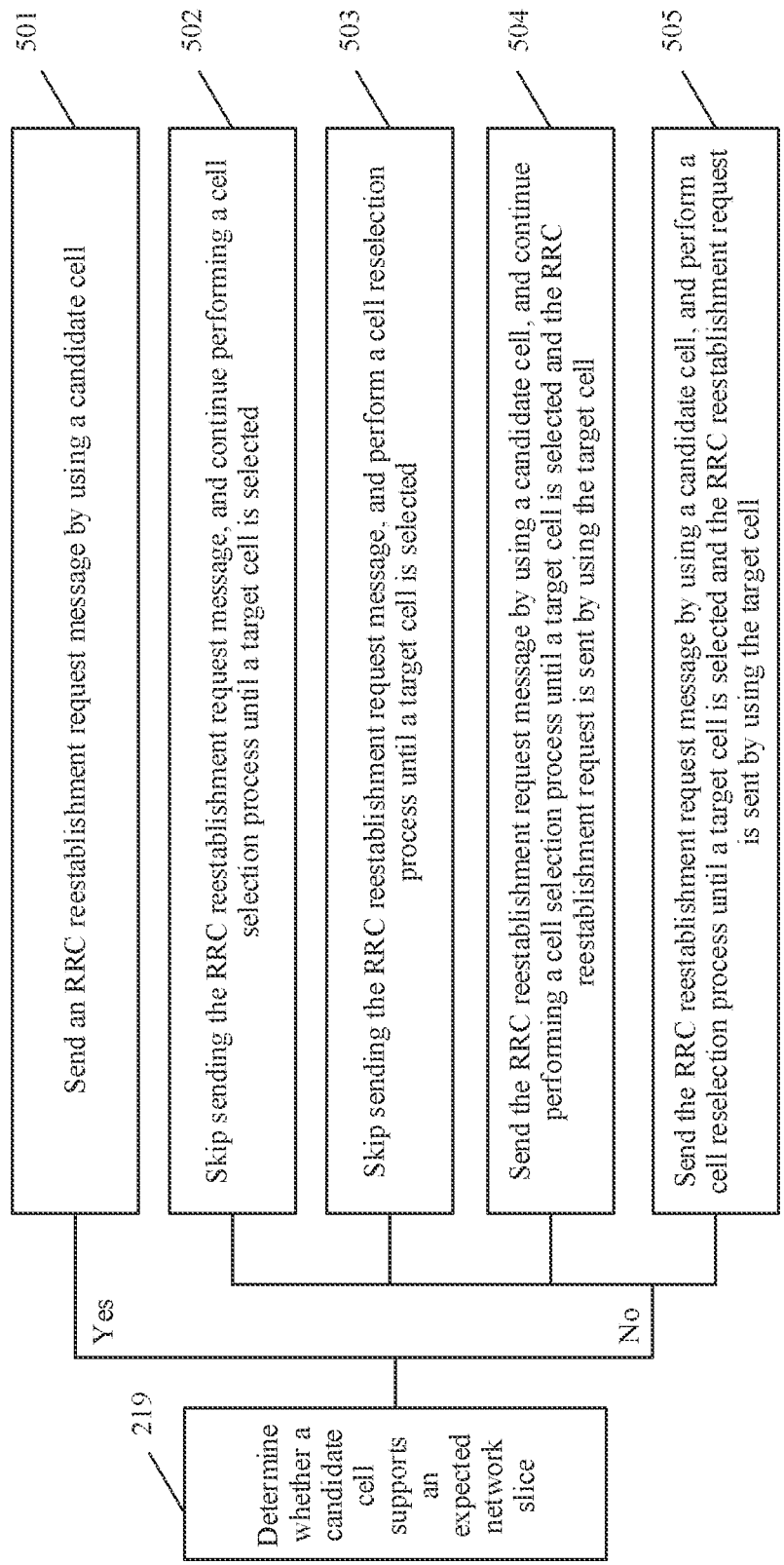
FIG. 5 is a schematic diagram of a cell selection process according to an embodiment of this application.

In some embodiments, as shown in FIG. 5, when a candidate cell supports the expected network slice, the terminal device may perform 501. The terminal device selects the candidate cell as the target cell, and sends an RRC reestablishment request message by using the target cell.

When the candidate cell does not support the expected network slice, the terminal device may perform one of 502 to 505.

In 502, the terminal device does not send the RRC reestablishment request message by using the candidate cell, and continues performing the cell selection process until the target cell is selected. That the terminal device continues to select the target cell through cell selection helps quickly select the target cell.

In 503, the terminal device does not send the RRC reestablishment request message by using the candidate cell, and performs the cell reselection process until the target cell is selected. That the terminal device continues to select the target cell through cell reselection helps select a target cell with good quality, for example, helps select a target cell with good RSRP.

In 504, the terminal device sends the RRC reestablishment request message by using the candidate cell, and continues performing the cell selection process until the target cell is selected and the terminal device sends the RRC reestablishment request message by using the target cell. The manner in 504 helps improve a success rate of RRC reestablishment. That the terminal device continues to select the target cell through cell selection helps quickly select the target cell.

In 505, the terminal device sends the RRC reestablishment request message by using the candidate cell, and performs the cell reselection process until the target cell is selected and the terminal device sends the RRC reestablishment request message by using the target cell. The manner in 505 helps improve a success rate of RRC reestablishment. That the terminal device continues to select the target cell through cell reselection helps select a target cell with good quality, for example, helps select a target cell with good. RSRP.

Because the terminal device sends the RRC reestablishment request message by using a candidate cell that does not support the expected network slice, that is, initiates a random access process, when the terminal device selects the target cell, the random access process initiated by using the candidate cell that does not support the expected network slice may be completed, or may not be completed. Optionally, after the target cell is selected, if the random access process initiated by using the candidate cell that does not support the expected network slice is not completed, the random access process is stopped, and the RRC reestablishment request message is sent by using the target cell, that is, the random access process is initiated by using the target cell.

In some other embodiments, in a preset time period, when selecting a cell, the terminal device considers whether a found candidate cell supports the expected network slice, and beyond the preset time period, the terminal device does no longer considers whether the candidate cell supports the expected network slice.

For example, when the terminal device initiates an RRC reestablishment procedure or starts a process of selecting a target cell, the terminal device may start a first timer. During running of the first timer, the terminal device considers whether a found candidate cell supports the expected network slice, that is, the terminal device selects a target cell. After the first timer expires, the terminal device no longer considers whether the candidate cell supports the expected network slice. In other words, the terminal device may select a cell that supports the expected network slice, or may select a cell that does not support the expected network slice.

Figure 6:
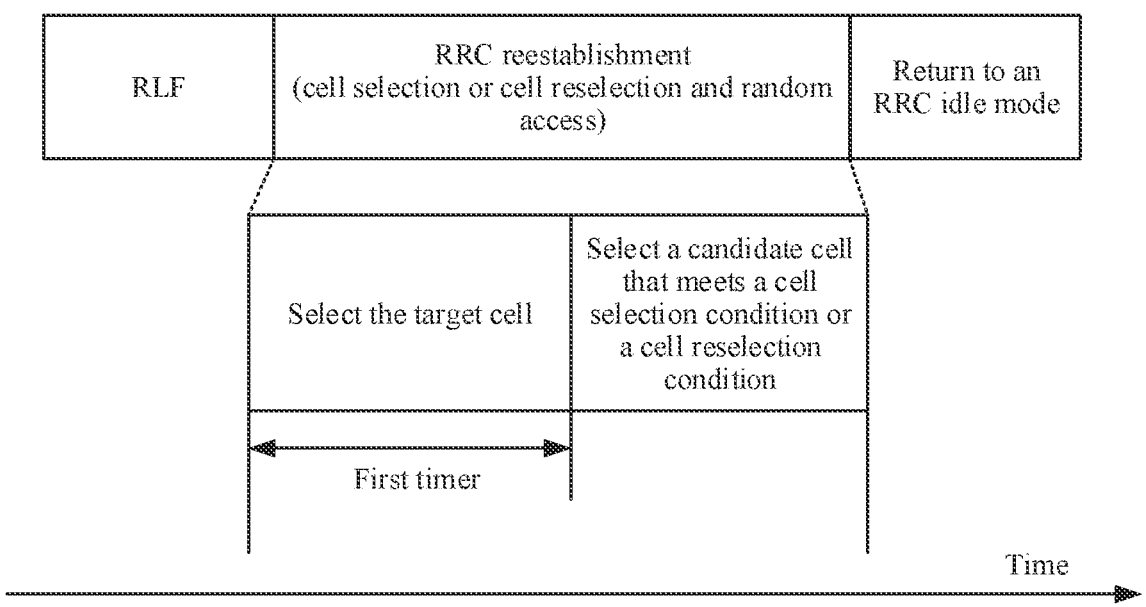
FIG. 6 is a schematic diagram of a first timer according to an embodiment of this application.

For example, as shown in FIG. 6, when a radio link failure (RLF) is detected, an RRC reestablishment procedure is triggered. In the RRC reestablishment procedure, the terminal device may perform cell selection or cell reselection, and initiate a random access process by using a selected cell. As shown in FIG. 6, when the RRC reestablishment procedure is triggered, the terminal device starts a first timer, and the terminal device selects a target cell during running of the first timer. If the first timer expires, the terminal device may send an RRC reestablishment request message by using a candidate cell that meets a cell selection condition or a cell reselection condition. In this case, the candidate cell may support the expected network slice, or may not support the expected network slice.

Figure 7:
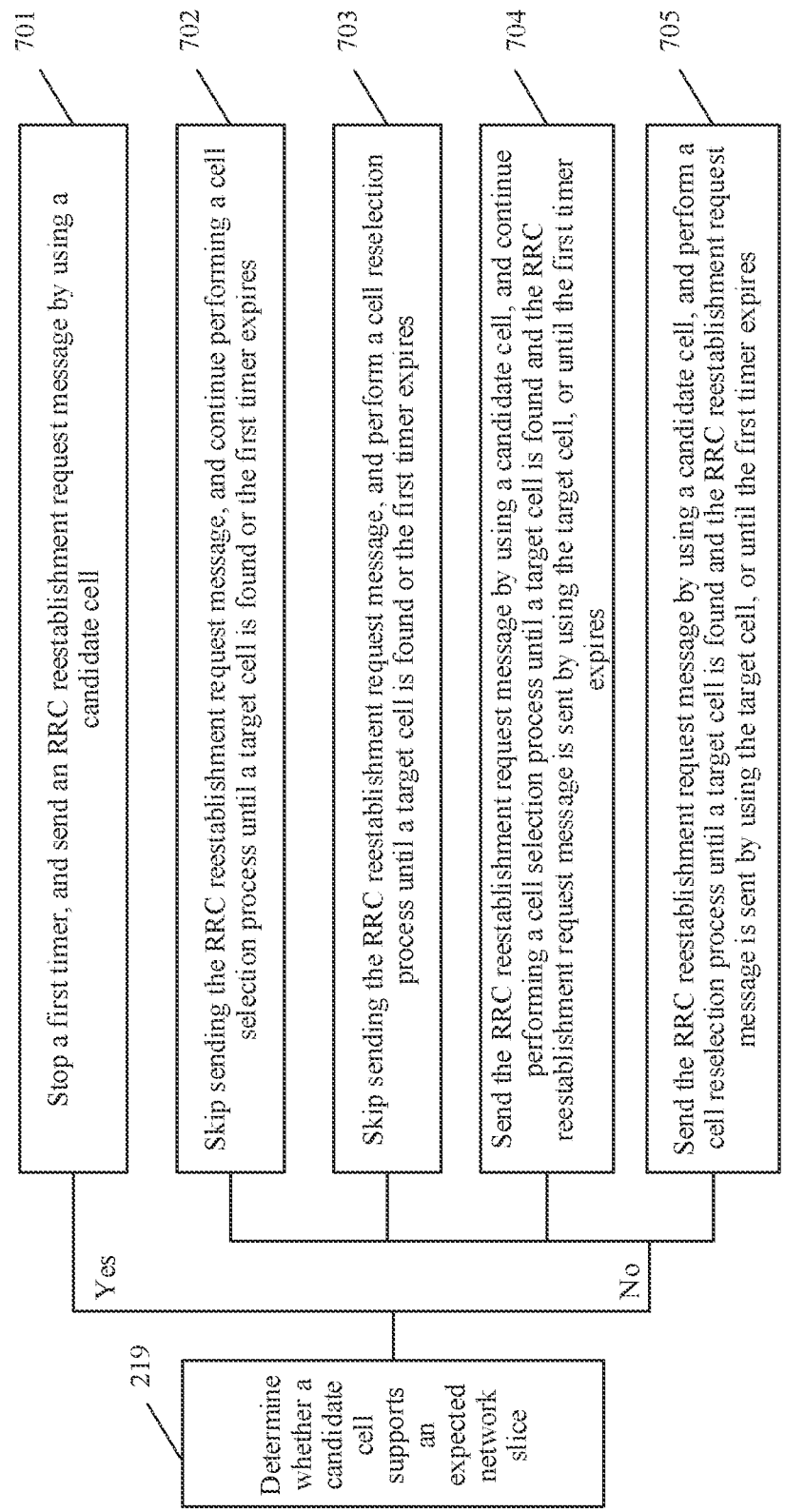
FIG. 7 is a schematic diagram of a cell selection process according to another embodiment of this application.

As shown in FIG. 7, when the candidate cell supports the expected network slice, the terminal device may perform 701. The terminal device stops the first timer, and sends the RRC reestablishment request message by using the candidate cell.

When the candidate cell does not support the expected network slice, the terminal device may perform one of 702 to 705.

In 702, the terminal device does not send the RRC reestablishment request message by using the candidate cell, and continues performing the cell selection process until the target cell is found or the first timer expires. That the terminal device continues to select the target cell through cell selection helps quickly select the target cell.

Optionally, after the first timer expires, the terminal device may send the RRC reestablishment request message by using a candidate cell that meets a cell selection condition or a cell reselection condition. In this case, the candidate cell may support the expected network slice, or may not support the expected network slice.

In 703, the terminal device does not send the RRC reestablishment request message by using the candidate cell, and performs the cell reselection process until the target cell is found or the first timer expires. That the terminal device continues to select the target cell through cell reselection helps select a target cell with good quality, for example, helps select a target cell with good RSRP.

Optionally, after the first timer expires, the terminal device may send the RRC reestablishment request message by using a candidate cell that meets a cell selection condition or a cell reselection condition. In this case, the candidate cell may support the expected network slice, or may not support the expected network slice.

In 704, the terminal device sends the RRC reestablishment request message by using the candidate cell, and continues performing the cell selection process until the target cell is found and the terminal device sends the RRC reestablishment request message by using the target cell, or until the first timer expires. The manner in 704 helps improve a success rate of RRC reestablishment. That the terminal device continues to select the target cell through cell selection helps quickly select the target cell.

Optionally, if the target cell is not found before the first timer expires, after completing random access by using the candidate cell, the terminal device may send a request message to the access network device, to request the access network device to hand over the terminal device to the target cell.

Optionally, the request message includes an identifier of the expected network slice.

In 705, the terminal device sends the RRC reestablishment request message by using the candidate cell, and performs the cell reselection process until the target cell is found and the terminal device sends the RRC reestablishment request message by using the target cell, or until the first timer expires. The manner in 705 helps improve a success rate of RRC reestablishment. That the terminal device continues to select the target cell through cell reselection helps select a target cell with good quality, for example, helps select a target cell with good RSRP.

Optionally, if the target cell is not found before the first timer expires, after completing random access by using the candidate cell, the terminal device may send a request message to the access network device, to request the access network device to hand over the terminal device to the target cell.

Optionally, the request message includes an identifier of the expected network slice.

Because the terminal device sends the RRC reestablishment request message by using a candidate cell that does not support the expected network slice, that is, initiates a random access process, when the terminal device selects the target cell, the random access process initiated by using the candidate cell that does not support the expected network slice may be completed, or may not be completed. Optionally, after the target cell is found, if the random access process initiated by using the candidate cell that does not support the expected network slice is not completed, the random access process is stopped, and the RRC reestablishment request message is sent by using the target cell, that is, the random access process is initiated by using the target cell.

In some other embodiments, when the terminal device initiates an RRC reestablishment procedure or starts a process of selecting a target cell, the terminal device may further start a second timer. The second timer controls duration in which terminal device performs RRC reestablishment. Duration of the first timer is less than the duration of the second timer. In other words, when the first timer expires, the second timer may still be running.

Figure 8:
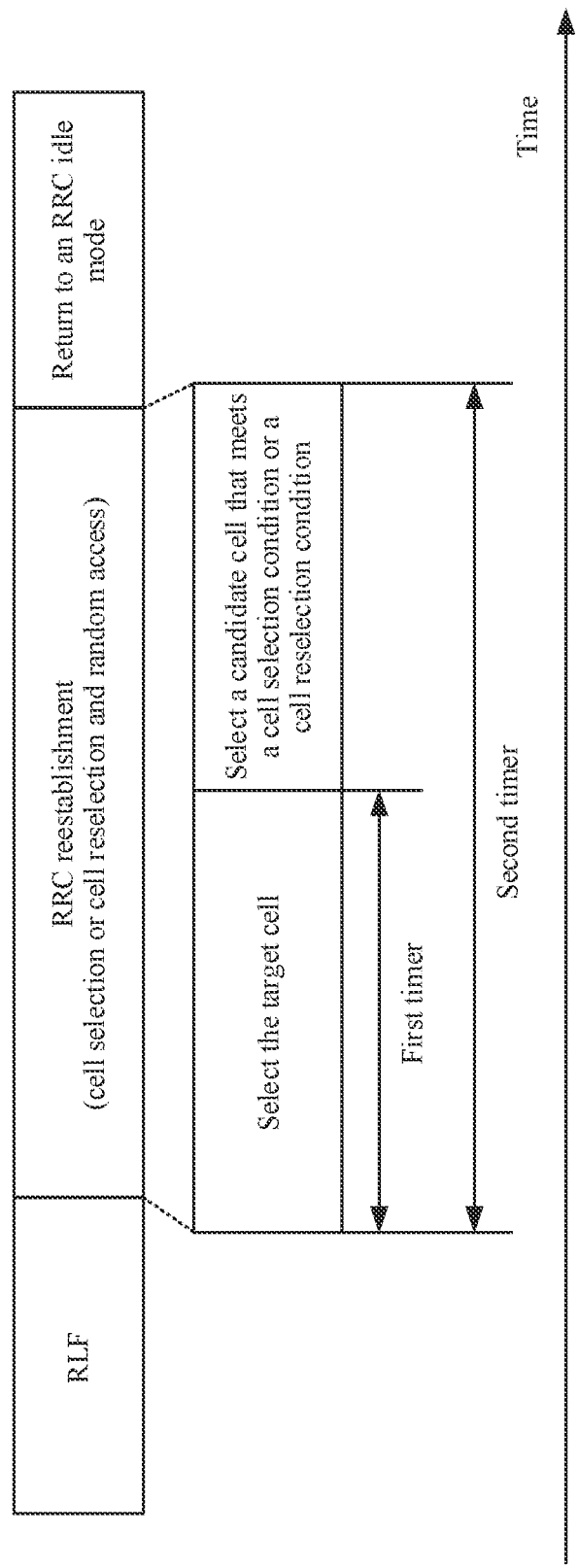
FIG. 8 is a schematic diagram of a first timer and a second timer according to an embodiment of this application.

For example, as shown in FIG. 8, when a radio link failure is detected, an RRC reestablishment procedure is triggered. In the RRC reestablishment procedure, the terminal device may perform cell selection or cell reselection, and initiate a random access process by using a selected cell. As shown in FIG. 8, when the RRC reestablishment procedure is triggered, the terminal device max further start the second timer while starting the first timer. The terminal device selects a target cell during running of the first timer. If the first timer expires, and the second timer is running, the terminal device may send an RRC reestablishment request message by using a candidate cell that meets a cell selection condition or a cell reselection condition. In this case, the candidate cell may support the expected network slice, or may not support the expected network slice RRC reestablishment. If the terminal device still does not complete RRC reestablishment when the second timer expires, the terminal device returns to an RRC idle mode.

Figure 9:
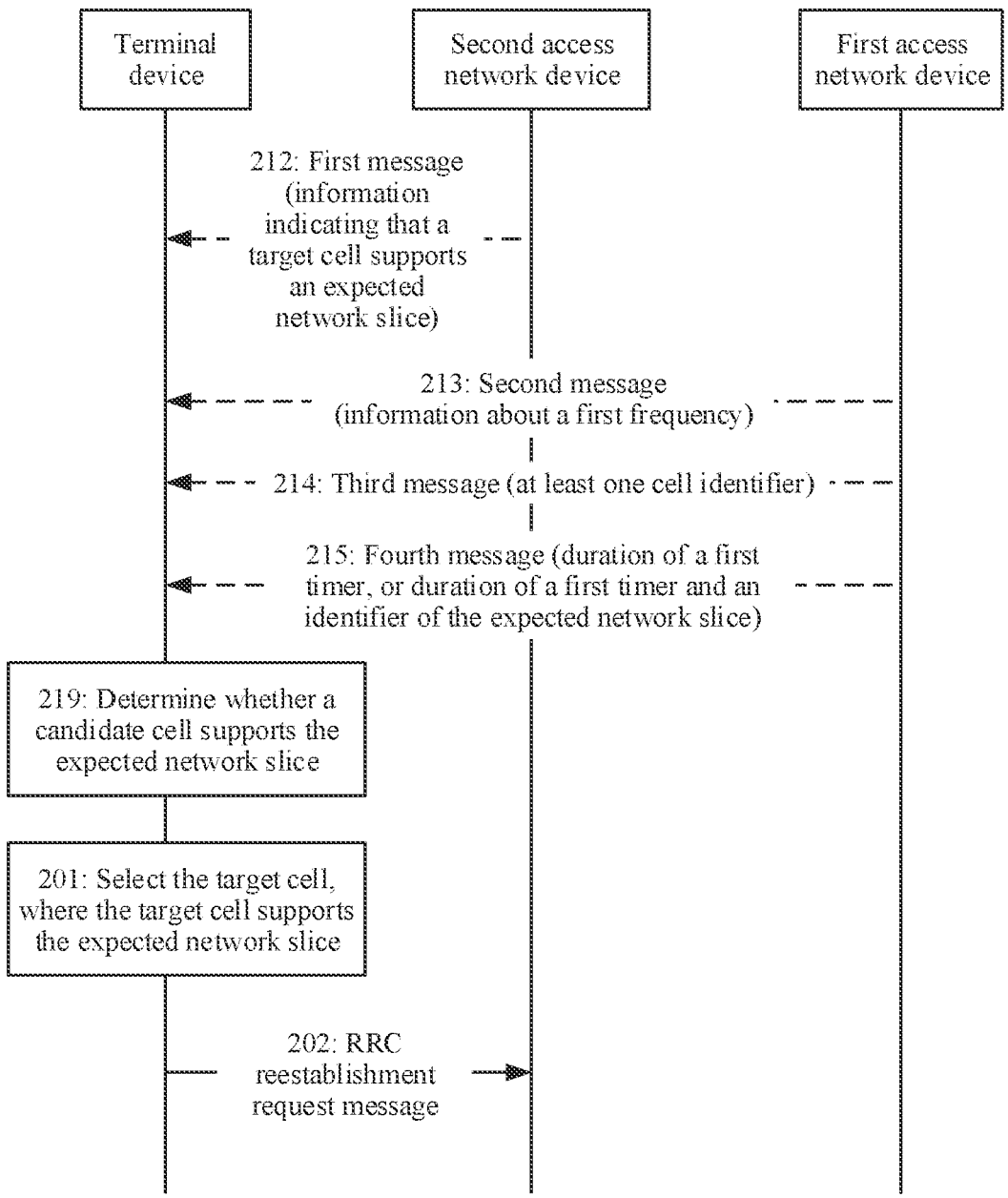
FIG. 9 is a schematic flowchart of an RRC reestablishment method according to another embodiment of this application.

FIG. 9 is a schematic flowchart of an RRC reestablishment method according to another embodiment of this application. The method shown in FIG. 9 may be performed by a terminal device, a first access network device, and a second access network device, or may be performed by modules or chips of a terminal device, a first access network device, and a second access network device. The following uses an example in which an execution body is the terminal device the first access network device, and the second access network device for description. For steps 201 and 202, 212 to 214, and 219 in FIG. 9, refer to related descriptions in FIG. 2 and FIG. 4. Details are not described herein again.

When the terminal device considers, within a preset time period, whether a found candidate cell supports the expected network slice, the terminal device and the network device may perform step 215. To be specific, the network device may send a fourth message to the terminal device. Correspondingly, the terminal device may receive the fourth message from the network device, where the fourth message indicates duration of a first timer. Optionally, the fourth message is an RRC message (for example, an RRC connection reestablishment message). The network device herein may be a first access network device, a core network device, or the like. In FIG. 9, the first access network device is used as an example.

Optionally, the duration of the first timer may be configured for a network slice, that is, configured per slice. In this way, when the terminal device corresponds to a plurality of network slices, duration of first timers respectively corresponding to the plurality of network slices may be the same or may be different. The fourth message may include the duration of the first timer and an identifier of the expected network slice, and the first timer corresponds to the expected network slice.

Optionally, the fourth message includes an identifier of at least one network slice and at least one piece of duration corresponding to the at least one network slice, where the duration is the duration of the first timer, and the at least one network slice includes the expected network slice.

Optionally, the fourth message includes at least one piece of duration, the at least one piece of duration corresponds to the at least one network slice, where the duration is the duration of the first timer, and the at least one network slice includes the expected network slice.

In this case, the terminal device determines, from the at least one piece of duration, duration corresponding to the expected network slice. Optionally, the terminal device determines that duration corresponding to the identifier of the expected network slice is the duration corresponding to the expected network slice. Optionally, the terminal device may further preferably select, based on a priority of the at least one network slice, duration corresponding to a network slice with a high priority as the duration corresponding to the expected network slice. For example, a network slice 1 corresponds to duration 1, a network slice 2 corresponds to duration 2, the network slice 2 is the expected network slice, and a priority of the network slice 1 is higher than a priority of the network slice 2. In this case, the terminal device determines the duration 1 as duration corresponding to the network slice 2.

Optionally, the duration of the first timer may be configured for the terminal device, that is, configured per UE. In this way, when the terminal device corresponds to a plurality of network slices, duration of first timers respectively corresponding to the plurality of network slices is the same. In this case, the fourth message includes the duration of the first timer.

For example, the fourth message includes one piece of duration. After receiving the fourth message, the terminal device determines that the duration is configured for the terminal device. In other words, the terminal device considers that the duration of the timer is configured per UE.

It should be noted that a running period of the timer is a period in which the timer is in a running state. Once the timer starts, and does not expire or is stopped, the timer is in the running state. Otherwise, the timer is not in the finning state. The timer starts from an initial value, and the initial value is the duration of the timer mentioned above.

It should be further noted that, that the fourth message includes the duration of the first timer and the identifier of the expected network slice, or that the fourth message includes the duration of the first timer may be that the fourth message directly includes a related information element, or the fourth message may perform indication in an indirect manner. This is not specifically limited in this embodiment of this application.

The following describes in detail technical solutions of embodiments of this application with reference to specific examples. For ease of descriptions, a cell that supports the expected network slice is referred to as a first cell below, and a cell that does not support the expected network slice is referred to as a second cell below.

Figures 10, 11:
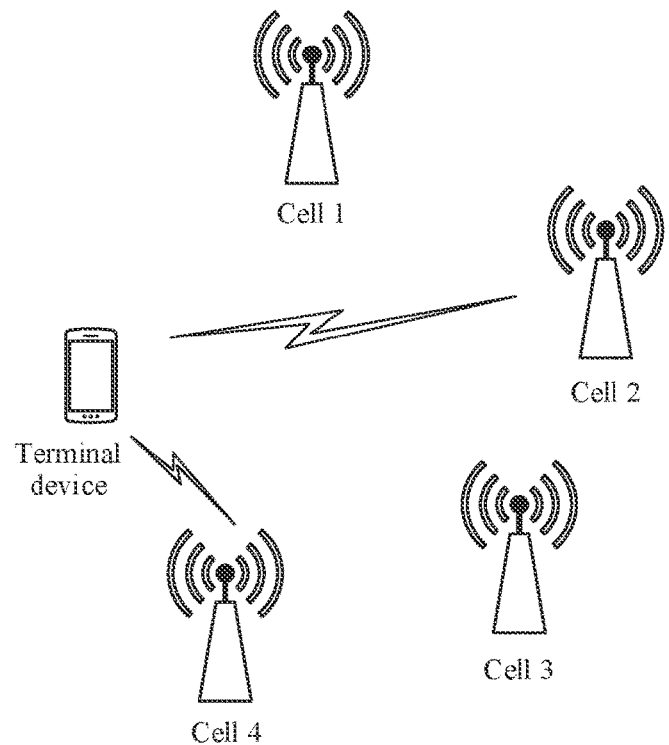
FIG. 10 shows an example 1 of a technical solution to which an embodiment of this application is applied.
FIG. 11 shows an example 2 of a technical solution to which an embodiment of this application is applied.

In a network slice scenario, as shown in FIG. 10 and FIG. 11, it is assumed that an expected network slice is a network slice 2, a cell 2 is a source cell, and a cell 1, a cell 3, and a cell 4 are candidate cells in an RRC reestablishment procedure. The cell 2 and the cell 4 support the network slice 2. The cell 1 supports a network slice 1 but does not support the network slice 2. The cell 3 does not support the network slices.

(1) In an RRC connected mode, the terminal device may be performing data transmission of a network slice service or a common service by using the cell 2.

(2) When any one of the following events occurs in the cell 2, the terminal device initiates an RRC reestablishment procedure, and starts a first timer and a second timer:

a radio link failure;

a synchronous reconfiguration failure;

an integrity check failure;

an RRC connection reconfiguration failure; or an inter-RAT handover failure.

The foregoing events cannot be predicted by the network device in advance.

(3) During running of the first timer, the terminal device preferably initiates, by using the first cell, random access used for RRC reestablishment, and does not choose to initiate, by using the second cell, a random access process used for RRC reestablishment. The random access process herein may be a four-step random access process, or may be a two-step random access process.

During running of the first timer, if the cell selected by the terminal device is the cell 4 under the cell selection condition or the cell reselection condition, and the cell 4 is the first cell, the terminal device may initiate random access to the second access network device by using the cell 4. If the cell selected by the terminal device is the cell 1 or the cell 3 under the cell selection condition or the cell reselection condition, and the cell 1 and the cell 3 are second cells, the terminal device continues cell selection, until the cell 4, namely, the first cell, is selected. In other words, during running of the first timer, even if the cell 1 and the cell 3 meet the cell selection condition or the cell reselection condition, the terminal device cannot initiate random access to the second access network device by using the two cells.

A reason for using the foregoing selection manner may be that a service of the network slice 2 is important. Therefore, the terminal device expects to preferentially perform an RRC reestablishment procedure by using a cell that supports the network slice 2.

If the terminal device still fails to select the cell 4 before the first timer expires, after the first timer expires, the terminal device may perform the RRC reestablishment procedure by using the cell 1 and the cell 3.

(4) If the second timer expires and the terminal device still does not complete the RRC reestablishment process, the terminal device switches to an RRC idle mode or an inactive mode.

Figure 12:
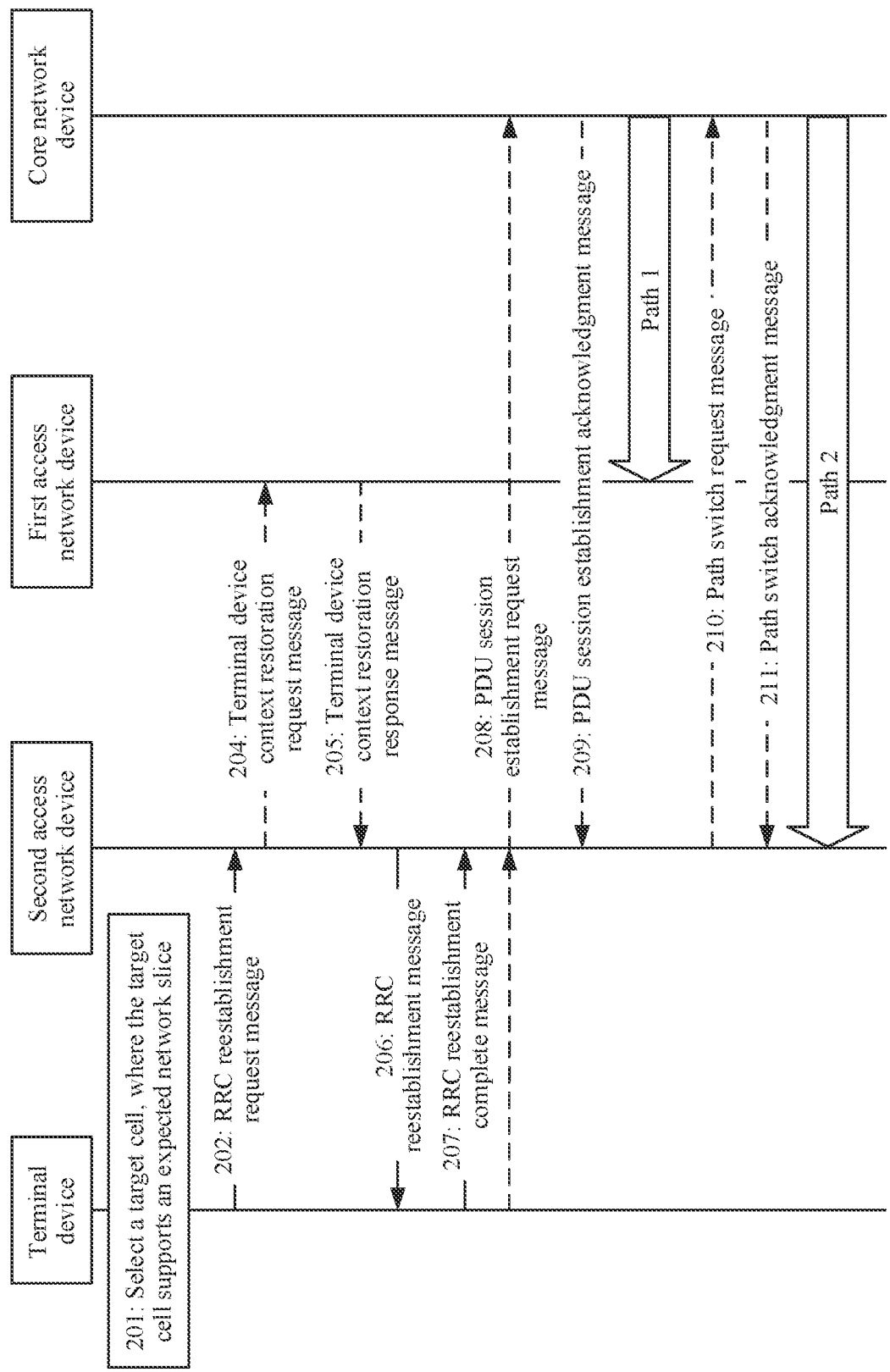
FIG. 12 is a schematic flow-chart of an RRC reestablishment method according to another embodiment of this application.

FIG. 12 is a schematic flowchart of an RRC reestablishment method according to another embodiment of this application. The method shown in FIG. 12 may be performed by a terminal device, a first access network device, a second access network device, and a core network device, or may be performed by modules or chips of a terminal device, a first access network device, a second access network device, and a core network device. The following uses an example in which an execution body is the terminal device, the first access network device, the second access network device, or the core network device for description. For steps 201 and 202 in FIG. 12, refer to related descriptions in FIG. 2. Details are not described herein again.

As shown in FIG. 12, in 206, the terminal device receives, by using a selected target cell, the RRC reestablishment message sent by the second access network device, where the RRC reestablishment message indicates the terminal device to reestablish an RRC connection.

In 207, the terminal device sends an RRC reestablishment complete message to the second access network device, to notify the network device that the RRC reestablishment is completed.

Optionally, if the second access network device does not have a context of the terminal device, the second access network device may obtain the context of the terminal device from the first access network device. For a specific procedure, refer to steps 204 and 205.

In 204, the second access network device sends a terminal device context restoration request message to the first access network device, to request to restore the context of the terminal device.

In 205, the first access network device sends a terminal device context restoration response message to the second access network device, and the second access network device may obtain the context of the terminal device by using the terminal device context restoration response message.

After the RRC reestablishment is completed, the terminal device may initiate, to the core network device by using the second access network device, establishment of a PDU session corresponding to the expected network slice. For a specific procedure, refer to steps 208 and 209.

In 208, the terminal device sends a PDU session establishment request message to the core network device (for example, an SMF) by using the second access network device, to request to establish the PDU session corresponding to the expected network slice.

In 209, the core network device sends a PDU session establishment acknowledgment message to the second access network device, to complete establishment of the PDU session corresponding to the expected network slice.

Alternatively, after the RRC reestablishment is completed, the terminal device may switch a path of the PDU session corresponding to the expected network slice (to be specific, switch from a path between the core network device and the first access network device (for example, a path 1 in FIG. 4) to a path between the core network device and the second access network device (for example, a path 2 in FIG. 4)). Before the path switching, the core network device may send downlink data by using the first access network device. After the path switching, the core network device sends downlink data by using the second access network device. For a specific procedure, refer to steps 210 and 211.

In 210, the terminal device sends a path switch (path switch) request to the core network device (for example, an AMF) by using the second access network device, to request to switch from a terminal device path between the first access network device and a UPF to a terminal device path between the second access network device and the UPF.

In 211, the core network device sends a path switch acknowledgment message to the second access network device, to complete the path switching of the PDU session.

After steps 208 and 209 or steps 210 and 211, the terminal device may transmit, by using the PDU session, data corresponding to the expected network slice.

Figure 13:
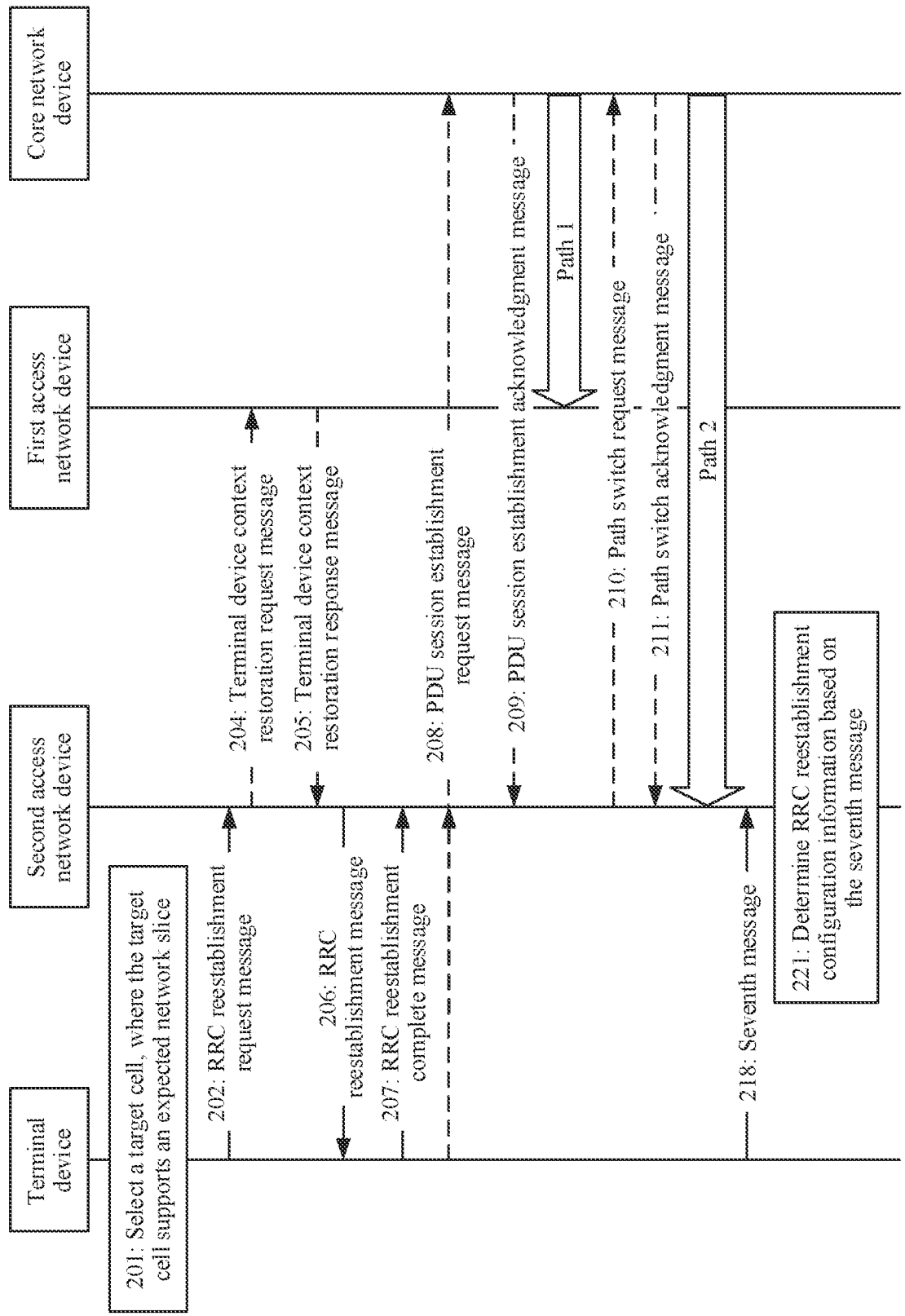
FIG. 13 is a schematic flowchart of an RRC reestablishment method according to another embodiment of this application.

FIG. 13 is a schematic flowchart of an RRC reestablishment method according to another embodiment of this application. The method shown in FIG. 13 may be performed by a terminal device, a first access network device, a second access network device, and a core network device, or may be performed by modules or chips of a terminal device, a first access network device, a second access network device, and a core network device. The following uses an example in which an execution body is the terminal device, the first access network device, the second access network device, or the core network device for description. For steps 201 and 202 in FIG. 13, refer to related descriptions in FIG. 2; and for steps 204 to 211, refer to related descriptions in FIG. 12. Details are not described herein again.

As shown in FIG. 13, the terminal device and the second access network device may further perform step 218. To be specific, the terminal device may further send a seventh message to the second access network device. Correspondingly, the second access network device receives the seventh message from the terminal device. The seventh message includes at least one of the following information:

whether to initiate random access by using a cell that does not support an expected network slice;

whether to initiate random access by using a cell that supports the expected network slice:

whether a first timer expires;

time from initiating RRC reestablishment to selecting the first available cell that supports the expected network slice;

a quantity of transmission times of a preamble of the first available cell that supports the expected network slice;

an identifier of the expected network slice, for example, an S-NSSAI of a network slice; or an identifier of at least one available cell that is selected during running of the first timer and that does not support the expected network slice.

The available cell may be a cell that meets a cell selection condition or a cell reselection condition.

It should be noted that, that the seventh message includes at least one of the foregoing information may be that the seventh message directly includes a related information element, or the seventh message may perform indication in an indirect manner. This is not specifically limited in this embodiment of this application.

Optionally, the seventh message may be a random access channel (random access channel, RACH) failure report.

In 221, after receiving the seventh message, the second access network device may perform network planning optimization based on the foregoing information included in the seventh message.

For example, the second access network device may determine, based on whether the terminal device initiates random access by using a cell that does not support the expected network slice and/or whether the terminal device initiates random access by using a cell that supports the expected network slice, whether a cell selection or cell reselection configuration is proper. When the cell selection or cell reselection configuration is improper, the second access network device may perform optimization, for example, redetermine and configure various thresholds.

For another example, the second access network device may determine, based on whether the first timer expires and an identifier of an available cell that is selected during running of the first timer and that does not support the expected network slice, whether deployment of the cell that supports the expected network slice is proper, to optimize deployment and setting of the cell.

For another example, the second access network device may determine, based on time from determining RRC reestablishment to selecting the first available cell that supports the expected network slice, whether coverage of the cell that supports the expected network slice is proper, to subsequently adjust a transmit power of a synchronization signal of the cell, so that the terminal device selects the target cell more quickly.

For another example, the second access network device may determine, based on a quantity of transmission times of a preamble (preamble) of the first available cell that supports the expected network slice, whether a random access configuration of the cell is proper, to subsequently adjust a resource of the random access configuration. For example, a larger quantity of transmission times indicates greater random access contention. In this case, more random access resources may be configured, to reduce contention.

For another example, the second access network device may determine, based on an identifier of the expected network slice, a network slice whose random access configuration is used by the terminal device. In this way, the second access network device can optimize a corresponding random access configuration.

It should be noted that the technical solutions in the foregoing embodiments may be applied to the network slice scenario, and may also be applied to an NTN/TN scenario and a public network/private network scenario. Specifically, when initiating RRC reestablishment, a terminal device selects a target cell, where the target cell is a cell of an expected type; and the terminal device sends an RRC reestablishment request message by using the target cell. Optionally, the cell of the expected type may be an NTN cell, a TN cell, a public network cell, a private network cell, or the like.

For example, if a last serving cell of the terminal device is an NTN cell, to maintain continuity of an NTN service, the terminal device expects to complete an RRC reestablishment procedure by using the NTN cell. In the RRC reestablishment procedure, the terminal device preferentially selects an NTN cell.

For another example, if the last serving cell of the terminal device is a TN cell, to maintain continuity of a TN service, the terminal device expects to complete the RRC reestablishment procedure by using the TN cell. In the RRC reestablishment procedure, the terminal device preferentially selects a TN cell.

For another example, if the last serving cell of the terminal device is a public network cell, to maintain continuity of a public network service, the terminal device expects to complete the RRC reestablishment procedure by using the public network cell. In the RRC reestablishment procedure, the terminal device preferentially selects a public network cell.

For another example, if the last serving cell of the terminal device is a private network cell, to maintain continuity of a private network service, the terminal device expects to complete the RRC reestablishment procedure by using the private network cell. In the RRC reestablishment procedure, the terminal device preferentially selects a private network cell.

For descriptions of selecting the target cell by the terminal device in the NTN/TN scenario and the public network/private network scenario, refer to the foregoing descriptions of steps 201 to 221, 501 to 505, and 701 to 705. Details are not described herein again.

It should be noted that the foregoing embodiments may be implemented separately, or may be properly combined for implementation.

It should be further noted that some messages in embodiments of this application may be a same message in some scenarios.

It may be understood that, to implement the functions in the foregoing embodiments, the communication apparatus includes a corresponding hardware structure and/or software module for performing each function. A person skilled in the art should easily be aware that, in combination with the units and the method steps in the examples described in embodiments disclosed in this application, this application can be implemented by hardware or a combination of hardware and computer software. Whether a function is performed by hardware or hardware driven by computer software depends on particular application scenarios and design constraints of the technical solutions.

FIG. 14 to FIG. 19 are schematic diagrams of structures of possible apparatuses according to embodiments of this application.

These apparatuses may be configured to implement functions of the terminal device, the first access network device, or the second access network device in the foregoing method embodiments, and therefore may also implement beneficial effects of the foregoing method embodiments. In embodiments of this application, the communication apparatus may be a terminal device, a first access network device, or a second access network device, or may be a module (such as a chip) applied to the terminal device, the first access network device, or the second access network device.

Figure 14:
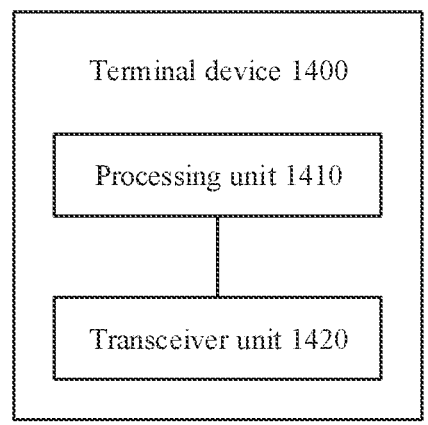
FIG. 14 is a schematic diagram of a structure of a terminal device according to an embodiment of this application.

FIG. 14 is a schematic diagram of a structure of a terminal device according to an embodiment of this application. As shown in FIG. 14, a terminal device 1400 includes a processing unit 1410 and a transceiver unit 1420.

The processing unit 1410 may perform steps 201 and 219 shown in the method embodiments.

The transceiver unit 1420 may perform steps 202, 206, 207, 208, and 212 to 218 shown in the method embodiments.

Alternatively, the processing unit 1410 is configured to initiate RRC reestablishment; the processing unit 1410 is further configured to select a target cell, where the target cell is a cell of an expected type; and the transceiver unit 1420 is configured to send an RRC reestablishment request message by using the target cell.

For specific functions and beneficial effects of the processing unit 1410 and the transceiver unit 1420, refer to the foregoing method embodiments. Details are not described herein again.

Figure 15:
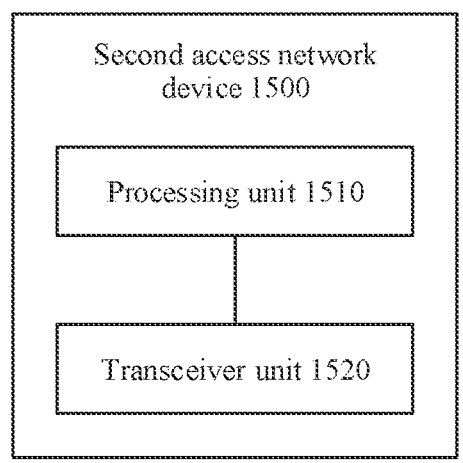
FIG. 15 is a schematic diagram of a structure of a second access network device according to an embodiment of this application.

FIG. 15 is a schematic diagram of a structure of a second access network device according to an embodiment of this application. As shown in FIG. 15, a second access network device 1500 includes a processing unit 1510 and a transceiver unit 1520.

The processing unit 1510 may perform step 221 shown in the method embodiments.

The transceiver unit 1520 may perform steps 202 to 212 and 216 to 218 shown in the method embodiments.

For specific functions and beneficial effects of the processing unit 1510 and the transceiver unit 1520, refer to the foregoing method embodiments. Details are not described herein again.

Figure 16:
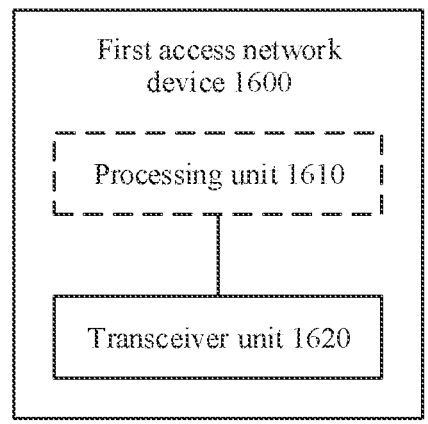
FIG. 16 is a schematic diagram of a structure of a first access network device according to another embodiment of this application.

FIG. 16 is a schematic diagram of a structure of a first access network device according to an embodiment of this application. As shown in FIG. 16, a first access network device 1600 includes a transceiver unit 1620.

The transceiver unit 1620 may perform steps 204, 205, and 213 to 215 shown in the method embodiments.

Optionally, the first access network device may further include a processing unit 1610, configured to control the transceiver unit 1620 to perform steps 204, 205, and 213 to 215.

For specific functions and beneficial effects of the processing unit 1610 and the transceiver unit 1620, refer to the foregoing method embodiments. Details are not described herein again.

Figure 17:
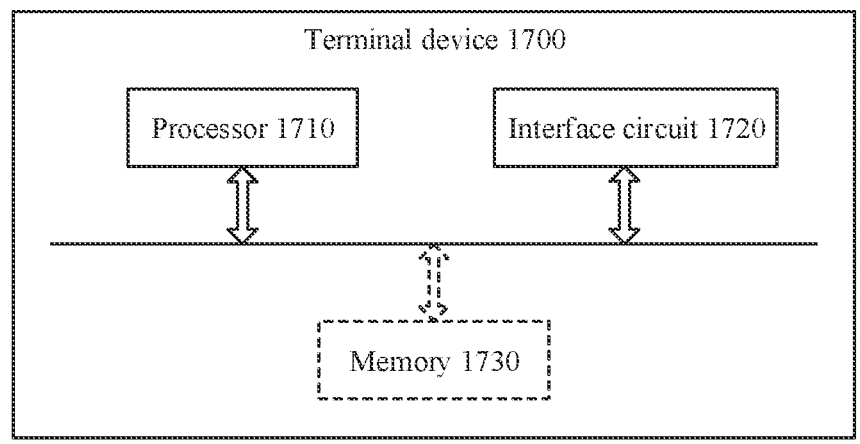
FIG. 17 is a schematic diagram of a structure of a terminal device according to another embodiment of this application.

FIG. 17 is a schematic diagram of a structure of a terminal device according to another embodiment of this application. As shown in FIG. 17, a terminal device 1700 includes a processor 1710 and an interface circuit 1720. The processor 1710 and the interface circuit 1720 are coupled to each other. It may be understood that the interface circuit 1720 may be a transceiver or an input/output interface. Optionally, the terminal device 1700 may further include a memory 1730, configured to: store instructions executed by the processor 1710, store input data required by the processor 1710 to run instructions, or store data generated after the processor 1710 runs instructions.

The processor 1710 may implement a function of the processing unit 1410 shown in FIG. 14, and the interface circuit 1720 may implement a function of the transceiver unit 1420 shown in FIG. 14.

For a specific working process and beneficial effects of the terminal device 1700, refer to related descriptions in the method embodiments. Details are not described herein again.

Figure 18:
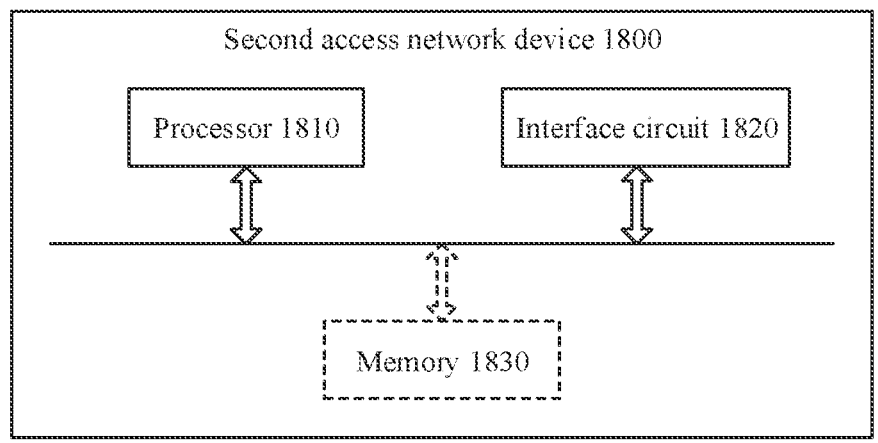
FIG. 18 is a schematic diagram of a structure of a second access network device according to another embodiment of this application.

FIG. 18 is a schematic diagram of a structure of a second access network device according to another embodiment of this application. As shown in FIG. 18, a second access network device 1800 includes a processor 1810 and an interface circuit 1820. The processor 1810 and the interface circuit 1820 are coupled to each other. It may be understood that the interface circuit 1820 may be a transceiver or an input/output interface. Optionally, the second access network device 1800 may further include a memory 1830, configured to: store instructions executed by the processor 1810, store input data required by the processor 1810 to run instructions, or store data generated after the processor 1810 runs instructions.

The processor 1810 may implement a function of the processing unit 1510 shown in FIG. 15, and the interface circuit 1820 may implement a function of the transceiver unit 1520 shown in FIG. 15.

For a specific working process and beneficial effects of the second access network device 1800, refer to related descriptions in the method embodiments. Details are not described herein again.

Figure 19:
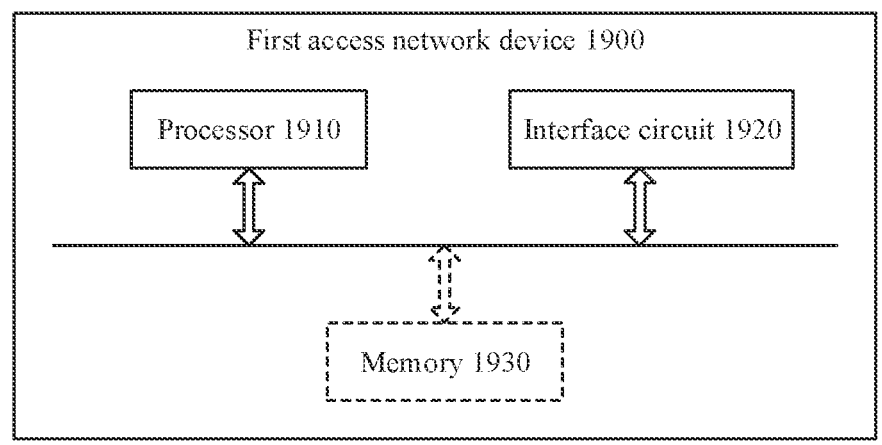
FIG. 19 is a schematic diagram of a structure of a first access network device according to another embodiment of this application.

FIG. 19 is a schematic diagram of a structure of a first access network device according to another embodiment of this application. As shown in FIG. 19, a first access network device 1900 includes a processor 1910 and an interface circuit 1920. The processor 1910 and the interface circuit 1920 are coupled to each other. It may be understood that the interface circuit 1920 may be a transceiver or an input/output interface. Optionally, the first access network device 1900 may further include a memory 1930, configured to: store instructions executed by the processor 1910, store input data required by the processor 1910 to run instructions, or store data generated after the processor 1910 runs instructions.

The processor 1910 may implement a function of the processing unit 1610 shown in FIG. 16, and the interface circuit 1920 may implement a function of the transceiver unit 1620 shown in FIG. 16.

For a specific working process and beneficial effects of the first access network device 1900, refer to related descriptions in the method embodiments. Details are not described herein again.

Figure 20:
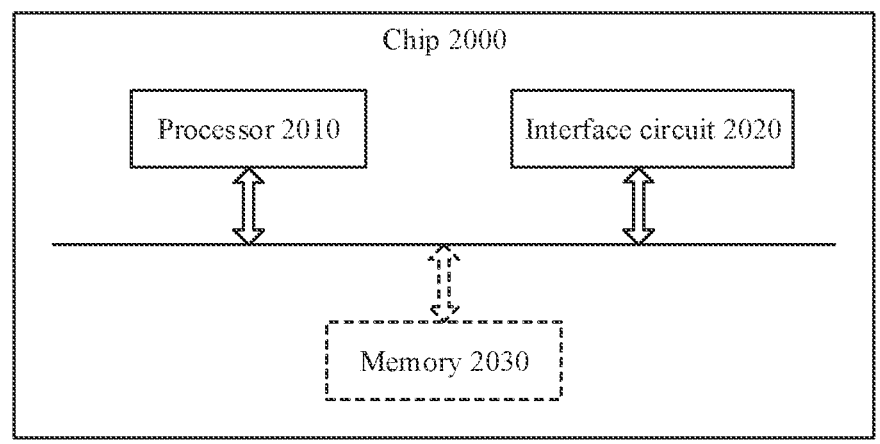
FIG. 20 is a schematic diagram of a structure of a chip according to an embodiment of this application.

FIG. 20 is a schematic diagram of a structure of a chip according to an embodiment of this application. As shown in FIG. 20, a chip 2000 includes a processor 2010 and an interface circuit 2020. The processor 2010 and the interface circuit 2020 are coupled to each other. It may be understood that the interface circuit 2020 may be a transceiver or an input/output interface. Optionally, the chip 2000 may further include a memory 2030, configured to: store instructions executed by the processor 2010, store input data required by the processor 2010 to run instructions, or store data generated after the processor 2010 runs instructions.

When the chip 2000 is configured to implement a function of the terminal device in FIG. 14, the processor 2010 is configured to implement a function of the processing unit 1410 shown in FIG. 14, and the interface circuit 2020 is configured to implement a function of the transceiver unit 1420 shown in FIG. 14.

When the chip 2000 is configured to implement a function of the second access network device in FIG. 15, the processor 2010 is configured to implement a function of the processing unit 1510 shown in FIG. 15, and the interface circuit 2020 is configured to implement a function of the transceiver unit 1520 shown in FIG. 15. When the chip 2000 is configured to implement a function of the first access network device in FIG. 16, the processor 2010 is configured to implement a function of the processing unit 1610 shown in FIG. 16, and the interface circuit 2020 is configured to implement a function of the transceiver unit 1620 shown in FIG. 16. It may be understood that the processor in this embodiment of this application may be a central processing unit (Central Processing Unit, CPU), may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA), another programmable logic device, a transistor logic device, a hardware component, or any combination thereof. The general purpose processor may be a microprocessor or any regular processor or the like.

The method steps in embodiments of this application may be implemented in a hardware manner, or may be implemented in a manner of executing software instructions by the processor. The software instructions may include a corresponding software module. The software module may be stored in a random access memory (Random Access Memory, RAM), a flash memory, a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in a first node, a donor node, or a first parent node. Certainly, the processor and the storage medium may exist in the first node, the donor node, or the first parent node as discrete components.

All or some of the foregoing embodiments may be implemented by using software, hardware, firmware, or any combination thereof. When the software is used for implementation, all or some of the embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, or another programmable apparatus. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape; may be an optical medium, for example, a DVD; or may be a semiconductor medium, for example, a solid-state drive (solid state disk, SSD).

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In this application, "at least one" means one or more, and "a plurality of" means two or more, "And/or" describes an association relationship between associated objects, and indicates that three relationships may exist. For example, A and/or B may indicate the following three cases: A exists alone, both A and B exist, and B exists alone, where A and B may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. Sequence numbers of the foregoing processes do not mean execution sequences. The execution sequences of the processes should be determined based on functions and internal logic of the processes.

A person of ordinary skill in the art may be aware that units and algorithm steps in the examples described with reference to the embodiments disclosed in this specification can be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or may not be performed. In addition, the displayed or discussed mutual couplings, direct couplings, or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A radio resource control (RRC) reestablishment method, wherein the method comprises:
   selecting, by a terminal device, a target cell, wherein the target cell is determined by the terminal device to support a network slice expected to be used by the terminal device; and
   sending, by the terminal device, an RRC reestablishment request message by using the target cell.

2. The method according to claim 1, wherein the method further comprises:
   receiving, by the terminal device, a first message from a second access network device, wherein the first message comprises information indicating that the target cell supports the expected network slice, and the second access network device is an access network device to which the target cell belongs.

3. The method according to claim 1, wherein the method further comprises:
   receiving, by the terminal device, a second message from a first access network device, wherein the second message comprises information about a first frequency, the first frequency supports the expected network slice, and the first access network device is a last serving access network device of the terminal device.

4. The method according to claim 1, wherein the method further comprises:
   receiving, by the terminal device, a third message from a first access network device, wherein the third message comprises at least one cell identifier, a cell corresponding to the at least one cell identifier supports the expected network slice, the at least one cell identifier comprises an identifier of the target cell, and the first access network device is a last serving access network device of the terminal device.

5. The method according to claim 1, wherein the selecting, by a terminal device, a target cell comprises:
   selecting, by the terminal device, the target cell within a preset time period.

6. The method according to claim 1, wherein the method further comprises:
   starting, by the terminal device, a first timer when the terminal device starts selecting the target cell; and
   wherein the selecting, by a terminal device, a target cell comprises:
   selecting, by the terminal device, the target cell during running of the first timer.

7. The method according to claim 6, wherein the method further comprises:
   stopping, by the terminal device, the first timer when the target cell is selected.

8. The method according to claim 6, wherein duration of the first timer is less than duration of a second timer, and the second timer controls duration in which the terminal device performs RRC reestablishment.

9. The method according to claim 6, wherein the method further comprises:
   receiving, by the terminal device, a fourth message from a first access network device or sent by a core network device, wherein the fourth message comprises duration of the first timer.

10. The method according to claim 6, wherein the method further comprises:
    receiving, by the terminal device, a fourth message from a first access network device or sent by a core network device, wherein the fourth message comprises duration of the first timer and an identifier of the expected network slice, and the first timer corresponds to the expected network slice.

11. A communication apparatus, comprising:
    at least one processor;
    one or more memories coupled to the at least one processor and storing programming instructions for execution by the at least one processor to select a target cell, wherein the target cell is determined by the apparatus to support a network slice expected to be used by the apparatus; and
    a transceiver, the transceiver configured to send a radio resource control (RRC) reestablishment request message by using the target cell.

12. The apparatus according to claim 11, wherein the transceiver is further configured to:
    receive a first message from a second access network device, wherein the first message comprises information indicating that the target cell supports the expected network slice, and the second access network device is an access network device to which the target cell belongs.

13. The apparatus according to claim 11, wherein the transceiver is further configured to:
    receive a second message from a first access network device, wherein the second message comprises information about a first frequency, the first frequency supports the expected network slice, and the first access network device is a last serving access network device of the communication apparatus.

14. The apparatus according to claim 11, wherein the transceiver is further configured to:
   receive a third message from a first access network device, wherein the third message comprises at least one cell identifier, a cell corresponding to the at least one cell identifier supports the expected network slice, the at least one cell identifier comprises an identifier of the target cell, and the first access network device is a last serving access network device of the communication apparatus.

15. The apparatus according to claim 11, wherein the programming instructions are for execution by the at least one processor to:
   select the target cell within a preset time period.

16. The apparatus according to claim 11, wherein the programming instructions are for execution by the at least one processor to:
   start a first timer when the communication apparatus starts selecting the target cell; and
   select the target cell during running of the first timer.

17. The apparatus according to claim 16, wherein the programming instructions are for execution by the at least one processor to:
   stop the first timer when the target cell is selected.

18. The apparatus according to claim 16, wherein duration of the first timer is less than duration of a second timer, and the second timer controls duration in which the apparatus performs RRC reestablishment.

19. The apparatus according to claim 16, wherein the transceiver is further configured to:
   receive a fourth message from a first access network device or sent by a core network device, wherein the fourth message comprises duration of the first timer.

20. The apparatus according to claim 16, wherein the transceiver is further configured to:
   receive a fourth message from a first access network device or sent by a core network device, wherein the fourth message comprises duration of the first timer and an identifier of the expected network slice, and the first timer corresponds to the expected network slice.

* * * * *